United States Patent
Wang et al.

(10) Patent No.: US 10,093,355 B1
(45) Date of Patent: Oct. 9, 2018

(54) VEHICLE AUTOMATIC POWER AND DRIVING CONTROL

(71) Applicant: ROBO INDUSTRIES, INC., Houston, TX (US)

(72) Inventors: Liang Wang, Houston, TX (US); Linli Zhang, Houston, TX (US)

(73) Assignee: Robo Industries, Inc., Houston, TX (US)

( * ) Notice: Subject to any disclaimer, the term of this patent is extended or adjusted under 35 U.S.C. 154(b) by 145 days.

(21) Appl. No.: 15/131,810

(22) Filed: Apr. 18, 2016

(51) Int. Cl.
*B62D 11/00* (2006.01)
*B62D 11/04* (2006.01)

(52) U.S. Cl.
CPC .......... *B62D 11/003* (2013.01); *B62D 11/04* (2013.01)

(58) Field of Classification Search
None
See application file for complete search history.

(56) References Cited

U.S. PATENT DOCUMENTS

| | | | |
|---|---|---|---|
| 7,596,451 B2 | 9/2009 | Stoller et al. | |
| 8,260,499 B2 | 9/2012 | Boydell | |
| 9,098,085 B2 | 8/2015 | Aznavorian et al. | |
| 2008/0121448 A1* | 5/2008 | Betz | B60K 6/12 180/65.31 |
| 2012/0179322 A1* | 7/2012 | Hennessy | G05D 1/0278 701/25 |
| 2013/0311153 A1* | 11/2013 | Moughler | G06Q 10/047 703/6 |

\* cited by examiner

*Primary Examiner* — Jonathan M Dager
*Assistant Examiner* — Garrett F Evans
(74) *Attorney, Agent, or Firm* — Lee & Hayes, PLLC

(57) ABSTRACT

A system configured to be mounted to a vehicle including a skid-based steering system. The system including a control unit for determining course correction to the vehicle during operation based on a navigation path received from a remote device and data associated with the movement of the vehicle collected by the system.

20 Claims, 15 Drawing Sheets

VEHICLE AUTOMATIC POWER AND DRIVING CONTROL

BACKGROUND

The presence of autonomous vehicles in today's world is becoming more and more common. Most systems are designed to control vehicles that include an axle or are configured such that the right and left side of the vehicle accelerate and decelerate in unison. However, these autonomous systems are ineffective when applied to vehicles that utilize skid-steering to independently control the acceleration and/or deceleration of the right and left side of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
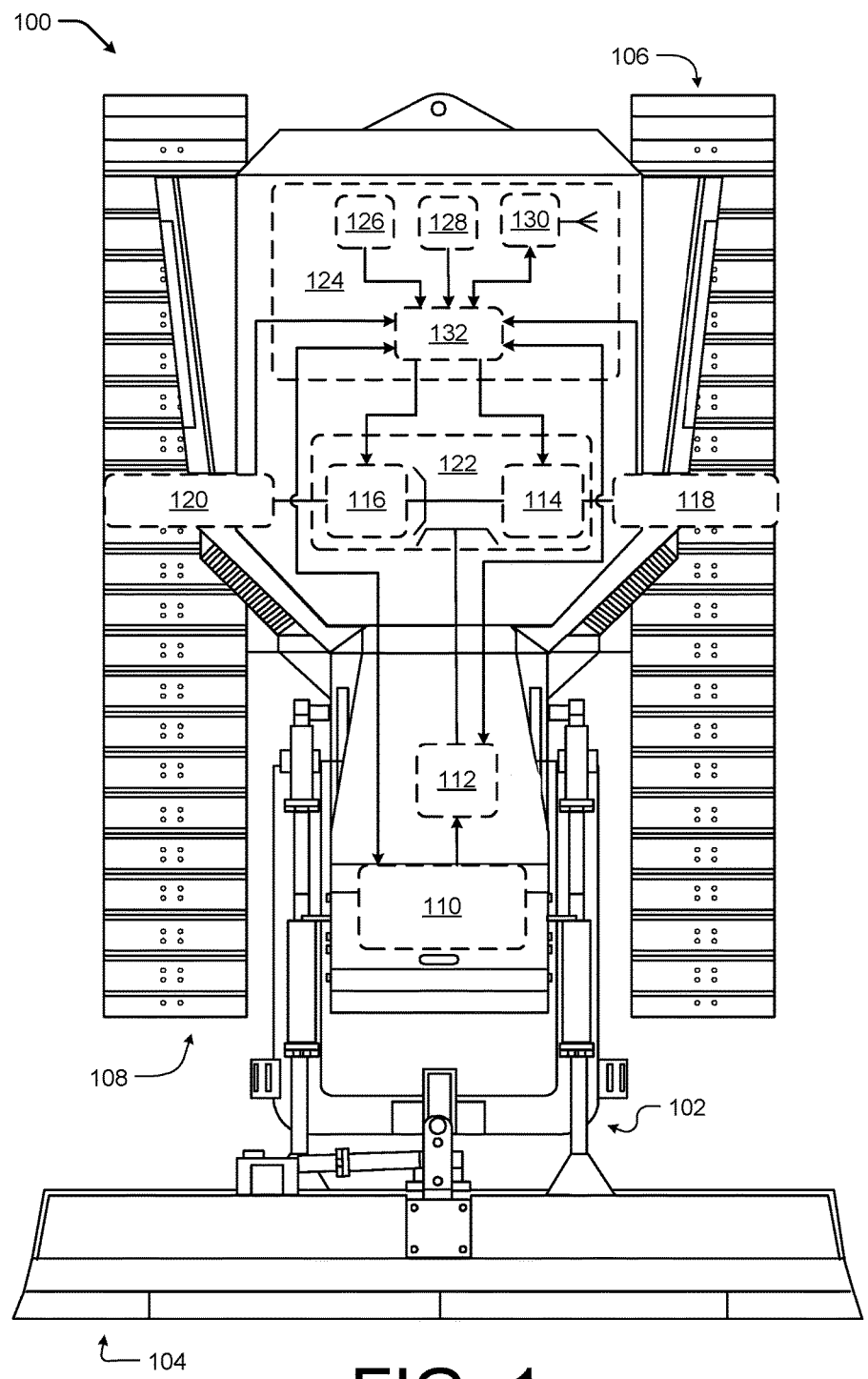
FIG. 1 is a top view of a system installed on a vehicle for enabling autonomous navigation and movement of the vehicle according to some implementations.

This disclosure includes techniques and implementations for monitoring and delivering power to drive members of a skid-steering system to enable autonomous control and movement. For example, work vehicles having treads or tracks (such as tractors, bulldozers, backhoes, military tanks, excavators, skid-steer loaders, among others), snowmobiles, propeller driven vehicles (such as propeller planes, some airboats, and motorboats), jet engine vehicles (such as jet boats, jet skis, and jet planes), among other types of vehicles may utilize skid-steering systems.

In some implementations, the systems described herein may include a control unit installed or mounted to a vehicle to monitor and control a power delivery system and the skid-based steering system of the vehicle. In other cases, the system described herein may include a control system, a power delivery system, a skid-based steering system, and a propulsion system configured to provide autonomous movement and control.

In one particular example, the autonomous propulsion system may include a power source (such as an engine) coupled to a power transfer device (such as a drivetrain). The power source may provide power to the power transfer device which converts the power to a state useful for propelling a vehicle. The power transfer device is coupled to a steering system.

The steering system may include a left drive motor and a right drive motor. The left drive motor controls the speed and/or power provided to a left propulsion device for controlling the movement of the left side of the vehicle and the right drive motor controls the speed and/or power provided to a right propulsion device for controlling the movement of the right side of the vehicle. In some cases, the steering system may be a skid-steer type steering system in which a speed differential may be introduced to the left and right propulsion devices by the left and right drive motors or by locking differentials introduced by left and right braking system respectively to cause a change in direction or course of the vehicle.

The autonomous propulsion system may also include a left propulsion monitoring unit and a right propulsion monitoring unit. The left propulsion monitoring unit may be coupled between the left drive motor and the left propulsion device to monitor an actual power transfer, direction, and/or velocity of the left side of the vehicle. Similarly, the right propulsion monitoring unit may be coupled between the right drive motor and the right propulsion device to monitor an actual power transfer, direction, and/or velocity of the right side of the vehicle.

The autonomous propulsion system also includes a control system. The control system may include one or more angle acquisition units, such as an inertial measurement unit (IMU), one or more positioning units (such as a Global Positioning System (GPS)), and a communication interface communicatively coupled to a control unit. The IMU is configured to collect data usable to determine rotation angles (pitch, roll, and yaw) associated with the vehicle. Similarly, the GPS system may be configured to decode a satellite signal in order to determine a position, orientation, and movement of the vehicle with respect to the surface of the Earth. The communication interface may be configured to receive a navigation path and progress parameters from an administrator system or remote control device.

The control unit may receive the navigation path and progress parameters from the communication interface. The control unit may also receive the rational angles and the positions, orientation, and movement data from the IMU and the GPS system. In some cases, the control unit may plot a course for the vehicle using the navigation path, the progress parameters, the rotation angles, and the positions data. The progress parameters may define maximum/minimum power consumption, maximum/minimum fuel usage, maximum/minimum speed, desired progress or distance of travel during a specified period of time (such as an hour, day, or week), maximum/minimum wear on the left and right propulsion devices. Additionally, the navigation path may provide the desired path of movement over the ground. In some examples, the control unit may determine a power range, a speed, and a course based at least in part on the navigation path and the progress parameters received from the communication interface.

The control unit may also be communicatively coupled to the power source and the power transfer device to control the power output and/or power range available to the propulsion system. For example, the control unit may send a first signal to the power source to specify an amount of power generation (or usage of a battery) of the power source and receive a second signal representative of the power output by the power source. The control unit may also send a third signal to the power transfer device to specify a power range (e.g., the total range of power that may be output by an engine) or amount of energy available to the left and right drive motors and receive a fourth signal representative of the total mechanical power (or power range) being output by the power transfer device.

The control unit may also be communicatively coupled to the left drive motor and the right drive motor of the steering system to control the heading and velocity of the vehicle. For example, the control unit may send a first speed signal to the steering system to cause the left drive motor to drive the left propulsion unit in a first specified direction (e.g., forward or backwards) at a first specified rate (or speed) and a second speed signal to the steering system to cause the right drive motor to drive the right propulsion unit in a second specified direction at a second specified rate. In other cases, the control unit may send a course signal including a heading and a speed to the steering system and the steering system may be configured to determine the direction and rates associated with the left drive motor and the right drive motor to achieve the corresponding heading and speed of the course signal. In this manner, the control unit may control the speed and direction of movement of the vehicle.
It should be understood, that the first specified direction may differ from the second specified direction, as when the vehicle is turning (e.g., the left propulsion unit may move forward and the right propulsion unit may move backward to affect a right turn or vice versa to affect a left turn). Similarly, the first specified rate may differ from the second specified rate to angle or adjust the direction of the vehicle (or again to turn the vehicle at a specified rate).

Additionally, the control unit may also be communicatively coupled to the left propulsion monitoring unit and the right propulsion monitoring unit. For example, the left propulsion monitoring unit may provide a signal representative of an actual velocity or rate or direction of propulsion associated with the left propulsion unit and the right propulsion monitoring unit may provide a signal representative of an actual velocity or rate or direction of propulsion associated with the right propulsion unit. For instance, in some cases, the actual conversion of power or energy into forward or backward motion may be greater than or less than expected due to, for example, wear and tear on the system and wheel or track slip on the system. Thus, in some cases, the control unit may specify parameters to achieve a rate of travel of 15 miles per hours but the actual forward motion may be 14.8 miles per hour. In this case, the control unit may receive the signals from the left propulsion monitoring unit and/or the right propulsion monitoring unit indicating a forward motion of 14.8 miles per hour. In response, the control unit may adjust power generation associated with the power source, the power range associated with the power transfer device, or the speed signals delivered to the left drive motor and/or the right drive motor to bring the actual speed of the vehicle up to 15 miles per hour.

In some implementations, the control unit may receive the navigation path and the progress parameters from an administrator system or remote control via the communications interface. In some cases, an administrator or operator may access the administrator system or remote control to create the navigation path and define the progress parameters. For example, the operator may outline terrain boundaries and a path over the given terrain, starting direction, the width of the path, maximum and minimum speed, maximum and minimum acceleration, maximum and minimum wear and tear, maximum and minimum power consumption, among others.

In one particular example, when the remote operator desires to create a navigation path, the administrator system or remote control may establish a communication channel with the control unit on the vehicle to check the health of the vehicle and the status and accuracy of the navigation controls. For example, the health of the vehicle may include the power range (e.g., the minimum and maximum rotation per minutes), the coolant temperature, oil pressure, battery voltage, wheel or rack slip rate, etc. In some cases, the vehicle may be determined to be healthy when the various parameters are within one or more thresholds or ranges (e.g., the coolant temperature is between a maximum and minimum acceptable temperature).

In some cases, the administrator system may cause the vehicle to perform one or more operations or maneuvers while the control unit tracks and reports the operational functionality of the vehicle back to the administrator system. For instance, the control unit may determine the vehicle's minimum turn radius is larger than expected given the make and model of the vehicle and report the information related to the turn radius back to the administrator system for input into the creation of the navigation path.

The operator may also provide inputs into the creation of the navigation path. For example, the administrator system may present the operator with selectable options to define the navigation path, to input the navigation parameters (e.g., width of the navigation path), select a type of navigation, type of activity or operation to be performed (e.g., in the case of a bulldozer, grading, leveling, sloping, etc.), operation preferences (e.g., time limits for the task, fuel usage limits, wear and tear limits, etc.).

The administrator system may also access information known about the vehicle and/or the terrain a database or data store related to the vehicle. For example, the system may include one or more data repositories including each vehicles' make/model, capabilities (e.g., size, steering radius, engine capacity, fuel tank size, equipment, implement blade size, maximum speed, minimum speed, acceleration, towing capacity, etc.), maintenance history, among others to assist with generating the navigation path and the progress parameters. The system may also access other data repositories or systems to collect information related to the terrain, such as topographical maps, surveying data, elevation, slope, and/or ground type (e.g., stone, gravel, clay, etc.). In some cases, the administrator system may allow the operator to select various information known about the vehicle, such as worn tracks, or about the terrain, such as exceptional hard rock.

The administrator system may generate and send the navigation path and the progress parameters to the control unit based at least in part on the data received from the control unit, the operator's inputs/selections, and the information accessed from various databases. In some cases, the administrator system may utilize fuzzy logic, machine learning, and/or various user generated tables to assist in generating the navigation path and the progress parameters to achieve the desired operation within the desired operation preferences selected by the operator.

The control unit may engage the power source, the power transfer device, and the left and right drive motors to cause the vehicle to move over the terrain in a manner and direction consistent with the navigation path based at least in part on the progress parameters received. For example, the control unit may determine a starting point associated with the navigation path and cause the vehicle to move to the starting point and position the vehicle such that the vehicle is moving in roughly the intended direction.

As the vehicle moves along the navigation path, the vehicle may wander from the navigation path generated by the administrator system. To correct for variations from the navigation path, during the operation of the vehicle, the control unit in conjunction with the other components of the system installed or mounted on the vehicle track the progress, position, speed, and direction of the vehicle during operations.

In one implementation, the control unit may determine the position and speed of the vehicle using the data received from the positioning units and the angle acquisition units. For example, the control unit may store data associated with a first position and a first time representative of a time at which the vehicle was at the first position. The control unit may subsequently at a second time (e.g., a time after the first time) determine a second position using the data received from the positioning units and the angle acquisition units at the second time. The control unit may then determine the speed of the vehicle based on the first time, the first position, the second time, and the second position. In some cases, the control unit may assign indicate a direction of the speed. For example, a positive value may represent forward movement of the vehicle and a negative value may represent backward movement of the vehicle.

The control unit may also determine the angles, angular rates, and acceleration from the data received from the positioning units and the angle acquisition units. For example, an IMU sensor package may include accelerometers, gyroscopes, magnetometers, and/or barometric pressure sensors that may provide data usable to determine the angles, the angular rates, and the acceleration of the vehicle. In another example, data from multiple positioning units, such two or more Global Navigation Satellite System (GNSS) sensors and receivers, may be utilized to determine some or all of the angles, the angular rates, and the acceleration.

In some cases, the current position, rotation angles, and ground speed of vehicle are determined for a point of interest associated with the vehicle. In one example, the point of interest may be a gravitational center of a ground plane of the vehicle to provide an accurate approximation of the true ground position of the vehicle. To estimate the current position, rotation angles, and ground speed of vehicle at the point of interest, the control unit may first apply an extended Kalman filter to the position, speed, angles, angular rates, and acceleration data to generate the estimated position, rotation angles, and ground speed of the vehicle at a position of the control unit (or at a control unit reference point, such as the location of a positioning unit). The control unit may next apply a position inference model to the estimated position, rotation angles, and ground speed of the vehicle at the reference point using a known geometric offset to determine the estimated position, rotation angles, and ground speed of the vehicle at the point of interest.

In some cases, the control unit may also determine variation in the estimated position, rotation angles, and ground speed of the vehicle at the point of interest with the desired position, rotation angles, and ground speed of the vehicle according to the navigation path. For example, the control unit may determine a current position error by measuring the lateral offset between the current position of the vehicle and a desired position of the vehicle according to the navigation path. The control unit may also determine a current heading angle error by subtracting the current heading of the vehicle from a desired heading according to the navigation path.

Once, the current position, the rotation angles, and the ground speed of the vehicle at the point of interest as well as the current position error and the current heading angle error are determined, the control unit may alter the course, speed, power output, power generation, etc. of the vehicle to bring the vehicle's position and heading back in-line with the path outlined by the navigation path taking into consideration the progress parameters defined by the operator. Initially, the control unit may determine if the current position error of the point of interest of the vehicle is greater than a position threshold or if the current heading error is greater than a heading threshold. If so, the control unit may determine a power source output adjustment, a power transfer device output adjustment, a left drive motor adjustment, and/or a right drive motor adjustment. The control unit may then adjust the direction and/or speed of the vehicle to return to the path indicated by the navigation path taking into consideration the progress parameters and the vehicle capabilities. For example, the control unit may not direct the vehicle to return directly to the path indicated in the navigation path to reduce the wear and tear on the propulsion devices and/or to reduce the power consumption of the vehicle.

FIG. 1 is a top view of an autonomous propulsion system 100 installed on a vehicle 102 for enabling autonomous navigation and movement of the vehicle 102 according to some implementations. In the current example, it should be understood that the components of the autonomous propulsion system 100 installed on the vehicle 102 are described with respect to a perspective of an individual positioned in the cab of the vehicle 102.

In the current example, the vehicle 102 is a work vehicle including a blade implement 104, such as a bulldozer, for moving earth. The vehicle 102 is configured with a skid-based steering system including a left propulsion device 106 and a right propulsion device 108. For instance, in the illustrated example, the left propulsion device 106 is a first track-laying unit and the right propulsion device 108 is a second track-laying unit. In the skid-based steering system, the left propulsion device 106 may move at a rate and in a direction different than the right propulsion device 108. In the current example, the left propulsion device 106 and the right propulsion device 108 are track-laying units. However, in some cases, one or both of the left propulsion device 106 and the right propulsion device 108 may be wheels, propellers, jets, or other devices for propelling a vehicle 102 over the ground, through the air, or through the water.

In addition to the left propulsion device 106 and the right propulsion device 108, the autonomous propulsion system 100 may include a power source 110 coupled to a power transfer device 112. In general, the power source 110 is utilized to generate or provide power to the vehicle 102. For instance, the power source 110 may be a diesel engine, as in the illustrated example. In other types of vehicles, however, the power source may be a gasoline engine, a gaseous fuel driven engine, a turbine engine, an electric motor, a hydraulic motor, or a battery.

The power transfer device 112 may be any type of device or component configured to convert power from power source 110 to a state useful for driving the left propulsion device 106 and the right propulsion device 108. For example, converting mechanical power into electrical power. In the illustrated example, the power transfer device 112 may be a transmission. In other examples, the power transfer device 112 may be a hydraulic pump, an electric generator or other type of power transferring component.

The power transfer device 112 is configured to provide a power range or maximum amount of power that may be utilized by a left drive motor 114 and/or a right drive motor 116. In the current example, the left drive motor 114 may cause the left propulsion device 106 to propel the left side of the vehicle 102 in a first direction and at a first rate and the right drive motor 116 may cause the right propulsion device 108 to propel the right side of the vehicle 102 in a second direction and at a second rate. In some cases, such as when the vehicle 102 is moving forward or backward in a straight line, the first direction and the second direction may be the same and the first rate and the second rate may be the same. In other cases, such as when the vehicle 102 is turning, the first direction and the second direction may be different and/or the first rate and the second rate may be different depending on the rate of angular change of the vehicle 102. For example, by propelling the left side of the vehicle 102 forward and the right side of the vehicle 102 backwards, the vehicle 102 may turn to the right and vice versa. In another example, by propelling the left side of the vehicle 102 forward at a rate greater than the right side of the vehicle 102, the vehicle 102 may continue moving forward but angling to the right of the previous heading. In the current example, the left drive motor 114 and the right drive motor 116 may be hydraulic motors, but in other examples, the left drive motor 114 and the right drive motor 116 may be a electric motor, brakes, clutches, etc.

In the current example, the left drive motor 114 and the right drive motor 116 may be part of a skid-steer type steering system 122. In some cases, the skid-steer type steering system 122 may operate by inducing a speed differential between the left propulsion device 106 and the right propulsion device 108 using the left drive motor 114 and the right drive motor 116. In other examples, the skid-steer type steering system 122 may be any type of steering system operable to change the course of the vehicle 102 by inducing a speed differential between a left and right propulsion device.

The autonomous propulsion system 100 may also include a left propulsion monitoring unit 118 and a right propulsion monitoring unit 120. The left propulsion monitoring unit 118 may be coupled between the left drive motor 114 and the left propulsion device 106 to monitor an actual power transfer, direction, and/or velocity of the left side of the vehicle 102. Similarly, the right propulsion monitoring 120 unit may be coupled between the right drive motor 116 and the right propulsion device 108 to monitor an actual power transfer, direction, and/or velocity of the right side of the vehicle 102. In some examples, the left propulsion monitoring unit 118 and the right propulsion monitoring unit 120 may be a speed encoder operable to measure the speed and direction of the left propulsion device 106 and the right propulsion device 108.

The autonomous propulsion system 100 also includes a control system 124. The control system 124 may include one or more angle acquisition units 124, one or more positioning units 126, and a communication interface 130 communicatively coupled to a control unit 132. The angle acquisition units 126 are configured to collect data usable to determine rotation angles (e.g., pitch, roll, and yaw) associated with the vehicle 102. The positioning units 128 may be configured to decode a satellite signal in order to determine positions, orientation, and movement of the vehicle 102 with respect to the surface of the Earth. The communication interface 130 may be configured to receive a navigation path and progress parameters from an administrator system or remote control device (not shown).

In some cases, the angle acquisition units 126 may include one or more accelerometers, one or more gyroscopes, one or more magnetometers, and/or one or more pressure sensors, among others sensors. In one particular example, the angle acquisition units 126 may include an inertial measurement unit (IMU) sensor or package. For instance, an IMU sensor or package may include three accelerometers placed orthogonally to each other, three rate gyroscopes placed orthogonally to each other, three magnetometers placed orthogonally to each other, and a barometric pressure sensor.

The positioning units 128 may include one or more sensor package combinations including Global Navigation Satellite System (GNSS) sensors and receivers, Global Positioning System (GPS) sensors and receivers, or other satellite systems. For example, the positioning units 128 may be configured to decode satellite signals in various formats or standards, such as GPS, GLONASS, Galileo, BeiDou. In some cases, the positioning units 128 may be placed at various locations on the vehicle 102 to improve the accuracy of the coordinates determined form the data received by each of the positioning units 128.

The communication interfaces 130 may support wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 130 may allow for communication with the administrator system or remote control device. For instance, in one example, the communication interface 130 may receive a navigation path and progress parameters from a remote system.

The control unit 132 may receive the rational angles and the positions, orientation, and movement data from the angle acquisition units 126 and the positioning units 128. In some cases, the control unit 132 may plot a course for the vehicle 102 using the navigation path, the progress parameters, the rotation angels, and the positions data. In some cases, the progress parameters may define maximum/minimum power consumption, maximum/minimum fuel usage, maximum/ minimum speed, desired progress or distance of travel during a specified period of time (such as an hour, day, or week), maximum/minimum wear on the left propulsion device 106 and right propulsion device 108. Additionally, the navigation path may provide the desired path of movement over the ground. In some examples, the control unit 132 may determine a power range, a speed, and a heading based at least in part on the navigation path and the progress parameters received from the communication interface 130.

In the current example, the control unit 132 is communicatively coupled to the power source 110 and the power transfer device 112 to control the power output and/or power range available to the left drive motor 114 and the right drive motor 116. For example, the control unit 132 may send a first signal to the power source 110 to specify the power generation of the power source 110 and receive a second signal representative of the power output by the power source 110. The control unit 132 may also send a third signal to the power transfer device 112 to specify a power range or amount of energy available to the left and right drive motors 114 and 116 and receive a fourth signal representative of the total power being output by the power transfer device 112.

The control unit 132 is also communicatively coupled to the left drive motor 114 rand the right drive motor 116 of the steering system 122. For example, the control unit 132 may send a first speed signal to the left drive motor 114 to cause the left drive motor 114 to drive the left propulsion unit 106 in a first specified direction (e.g., forward or backwards) at a first specified rate (or speed). Likewise, a second speed signal may be sent to the right drive motor 116 to cause the right drive motor 116 to drive the right propulsion unit 108 in a second specified direction at a second specified rate. In this manner, the control unit 132 may control the speed and direction of motion of the vehicle 102. It should be understood, that the first specified direction may differ from the second specified direction, as when the vehicle 102 is turning (e.g., the left propulsion device 106 may move forward and the right propulsion device 108 may move backward to affect a right turn or vice versa to affect a left turn). Similarly, the first specified rate may differ from the second specified rate to angle or adjust the direction of the vehicle 102 (or again to turn the vehicle 102 at a specified rate).

In this example, the control unit 132 is further communicatively coupled to the left propulsion monitoring unit 118 and the right propulsion monitoring unit 122. For example, the left propulsion monitoring unit 118 may provide a signal representative of an actual velocity or rate and direction of propulsion associated with the left propulsion device 106 and the right propulsion monitoring unit 120 may provide a signal representative of an actual velocity or rate and direction of propulsion associated with the right propulsion device 108. For instance, in some cases, the actual conversion of power or energy into forward or backward motion may be greater than or less than expected due to, for example, wear and tear on the system 100. Thus, in some cases, the control unit 132 may specify parameters to achieve a rate of travel of 15 miles per hours but the actual forward motion may be 14.8 miles per hour. In this case, the control unit 132 may receive the signals from the left propulsion monitoring unit 118 and/or the right propulsion monitoring unit 120 indicating a forward motion of 14.8 miles per hour. In response, the control unit 132 may adjust the power generation associated with the power source 110, the power range associated with the power transfer device 112, or the speed signals delivered to the left drive motor 114 and/or the right drive motor 116 to bring the actual speed of the vehicle 102 up to 15 miles an hour.

It should be understood that the system 100 is for example purposes. And that in other implementations, power transfer system 112, and the left and right drive motors 114 and 116, may be omitted. Additionally, power transfer system 112 may include one or more power-conversion systems, such as an electric generator and an electric motor, connected between power source 110 and the left and right propulsion devices 106 and 108. Furthermore, power source 110 may be a type of component configured to transfer power directly to the environment surrounding vehicle 102, such as a jet engine or a rocket. Moreover, in some implementations, some or all of the components of system 100 may be external to the vehicle 102.

Figure 2:
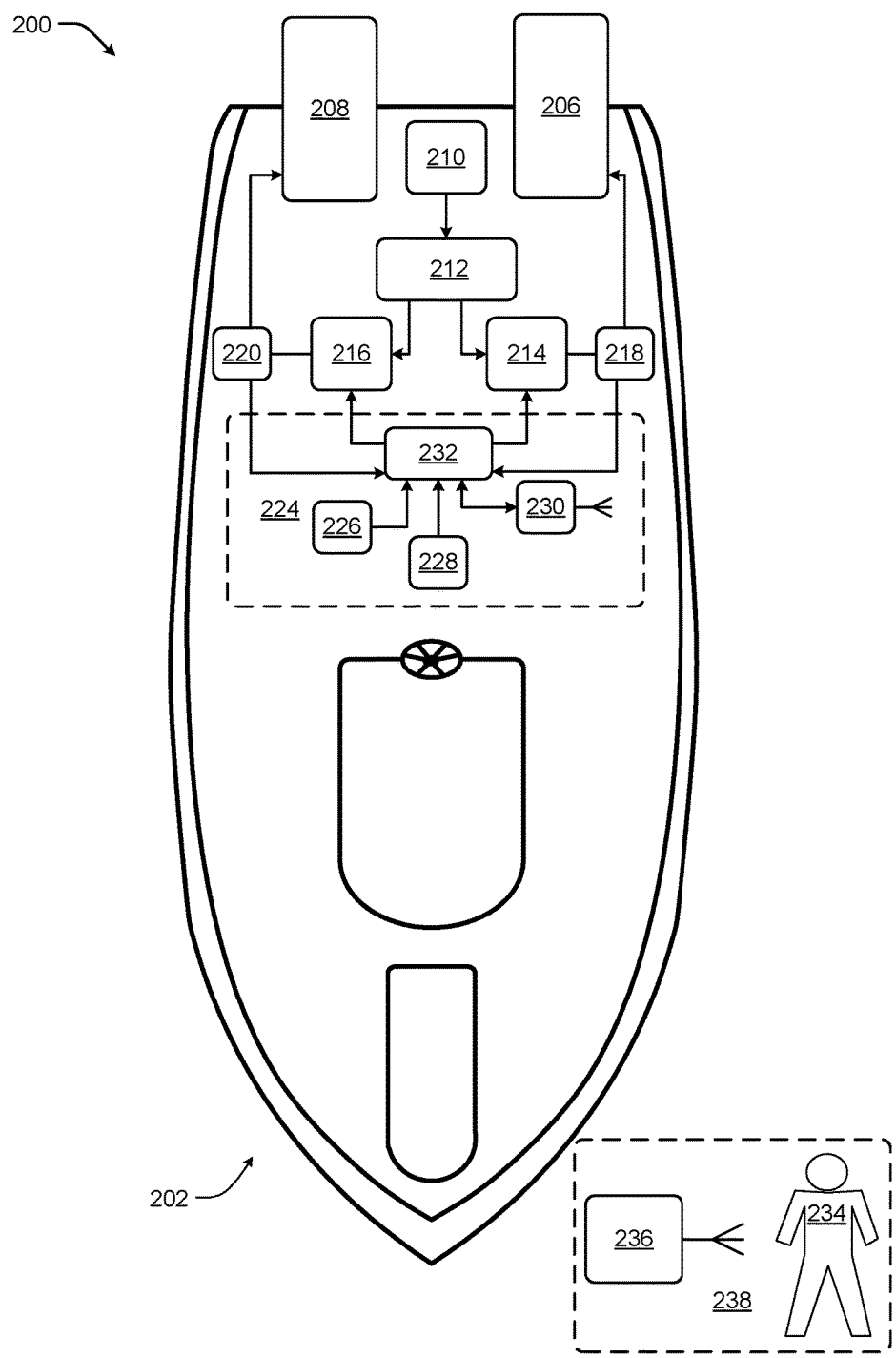
FIG. 2 is a top view of a system installed on another vehicle for enabling autonomous navigation and movement of the vehicle according to some implementations

FIG. 2 is a top view of a system 200 installed on another vehicle 202 for enabling autonomous navigation and movement of the vehicle 202 according to some implementations. In the current example, the vehicle 202 is a jet boat. The vehicle 202 is configured with skid-based steering system including a left propulsion device 206 and a right propulsion device 208. For instance, in the illustrated example, the left propulsion device 206 is a first jet drive system and the right propulsion device 208 is a second jet drive system. In the skid-based steering system, the left propulsion device 206 may move at a rate and in a direction different than the right propulsion device 208.

In addition to the left propulsion device 206 and the right propulsion device 208, the autonomous propulsion system 200 may include a power source 210 coupled to a power transfer device 212. In general, the power source 210 is utilized to generate or provide power to the vehicle 202. For instance, the power source 210 may be a gas engine or battery. The power transfer device 212 may be any type of device or component configured to convert power from the power source 210 to a state useful for driving the left propulsion device 206 and the right propulsion device 208. For instance, in the illustrated example, the power transfer device 212 may be a hydraulic pump.

The power transfer device 212 is configured to provide a power range or maximum amount of power that may be utilized by a left drive motor 214 and/or a right drive motor 216. In the current example, the left drive motor 214 may cause the left propulsion device 206 to propel the left side of the vehicle 202 in a first direction and at a first rate. Similarly, the right drive motor 216 may cause the right propulsion device 208 to propel the right side of the vehicle 202 in a second direction and at a second rate. In some cases, such as when the vehicle 202 is moving forward or backwards in a straight line the first direction and the second direction may be the same and the first rate and the second rate may be the same. In other cases, such as when the vehicle 202 is turning, the first direction and the second direction may be different and/or the first rate and the second rate may be different depending on the rate of angular change of the vehicle 202. For example, by propelling the left side of the vehicle 202 forward and the right side of the vehicle 202 backwards, the vehicle 202 may turn to the right and vice versa. In another example, by propelling the left side of the vehicle 202 forward at a rate greater than the right side of the vehicle 202, the vehicle 202 may continue moving forward but angling to the right of the previous heading. In the current example, the left drive motor 214 and the right drive motor 216 may be a electrical motor.

The autonomous propulsion system 200 may also include a left propulsion monitoring unit 218 and a right propulsion monitoring unit 220. The left propulsion monitoring unit 218 may be coupled between the left drive motor 214 and the left propulsion device 206 to monitor an actual power transfer, direction, and/or velocity of the left side of the vehicle 202. Similarly, the right propulsion monitoring 220 unit may be coupled between the right drive motor 216 and the right propulsion device 208 to monitor an actual power transfer, direction, and/or velocity of the right side of the vehicle 202.

The autonomous propulsion system 200 also includes a control system 224. The control system 224 may include one or more angle acquisition units 224, one or more positioning units 226, and a communication interface 230 communicatively coupled to a control unit 232. The angle acquisition units 226 are configured to collect data usable to determine rotation angles (e.g., pitch, roll, and yaw) associated with the vehicle 202. The positioning units 228 may be configured to decode a satellite signal in order to determine positions, orientation, and movement of the vehicle 202 with respect to the surface of the Earth. The communication interface 230 may be configured to receive a navigation path and progress parameters from a remote operator 234 using an administrator system 236 at a location 238 remote from the vehicle 202.

In some cases, the operator 234 may access the administrator system 236 to create the navigation path and define the progress parameters. For example, the navigation path may include terrain boundaries, a path over the given terrain, starting direction, the width of the path, type of navigation, type of activity or operation to be performed as outlined by the operator 236. The progress parameters may include preferences of the operator 234 with respect to completing the task or operation selected for the vehicle 202. For example, the progress parameters may include a maximum and minimum speed, maximum and minimum acceleration, maximum and minimum wear and tear, maximum and minimum power consumption, among others.

In one particular example, when the operator 234 desires to create a navigation path, the administrator system 236 may establish a communication channel with the control unit 232 via the communication interface 230 on the vehicle 202 to check the health of the vehicle 202 and the status and accuracy of the autonomous propulsion system 200. The administrator system 236 may send instructions to the control unit 232 to cause the vehicle 202 to perform one or more operations or maneuvers while the control unit 232 tracks and reports the operational functionally of the vehicle 202 back to the administrator system 236 using the angle acquisition units 226, the positioning units 228, the left propulsion monitoring unit 218, and/or the right propulsion monitoring unit 220. For instance, the control unit 232 may determine that the vehicle's 202 minimum turn radius is larger than expected based on the rotation angle measurements from the angle acquisition units 226 and the position data received from the positioning units 228 and report the information related to the turn radius back to the administrator system 236 for input into the creation of the navigation path.

The operator 234 may also provide inputs into the creation of the navigation path. For example, the administrator system 236 may present the operator 234 with selectable options to define the navigation path, to input the navigation parameters (e.g., width of the navigation path), select a type of navigation, type of activity or operation to be performed (e.g., in the case of a bulldozer, grading, leveling, sloping, etc.), operation preferences (e.g., time limits for the task, fuel usage limits, wear and tear limits, etc.).

The administrator system 236 may also access information known about the vehicle 202 and/or the terrain a database or data store related to the vehicle 202. For example, the administrator system 236 may access one or more data repositories including the vehicle's 202 make/model, capabilities (e.g., size, steering radius, engine capacity, fuel/tank size, equipment, maximum minimum speed, acceleration, towing capacity, etc.), and/or maintenance history, to assist with generating the navigation path and the progress parameters. The administrator system 236 may also access other data repositories or systems to collect information related to the terrain, such as topographical maps, surveying data, elevation, slope, and/or ground type. In some cases, the administrator system 236 may allow the operator 234 to select various information known about the vehicle 202 or about the terrain. In some cases, the administrator system 236 may utilize fuzzy logic, machine learning, and/or various user generated tables to assist in generating the navigation path and the progress parameters to achieve the desired operation within the desired operation preferences selected by the operator 234.

In some implementations, the angle acquisition units 226 may include one or more sensors for determining a direction, orientation, and rotation angles associated with the vehicle 202. The positioning units 228 may include one or more sensors and/or receivers to determine a location of the vehicle 202 by decoding a satellite signal. The communication interfaces 230 may support wireless communication with the administrator system 236. For example, the communication interfaces 230 may allow the operator 234 to generate and send a navigation path and progress parameters to the control unit 232. The communication interfaces 230 may also allow the control unit 232 to provide the administrator system 236 with vehicle health data and operational status of the system 200.

In one example, the control unit 232 may receive the rational angles and the positions, orientation, and movement data from the angle acquisition units 226 and the positioning units 228. In some cases, the control 232 unit may plot a course for the vehicle 202 using the navigation path, the progress parameters, the rotation angels, and the positions data. In some cases, the progress parameters may define maximum/minimum power consumption, maximum/minimum fuel usage, maximum/minimum speed, desired progress or distance of travel during a specified period of time (such as an hour, day, or week), maximum/minimum wear on the left propulsion device 206 and right propulsion device 208 and the navigation path may provide the desired path of movement over the ground. In some examples, the control unit 232 may determine a power range, a speed, and a heading based at least in part on the navigation path and the progress parameters received from the communication interface 230.

In the current example, the control unit 232 is communicatively coupled to the power source 210 and the power transfer device 212 to control the power output and/or power range available to the left drive motor 214 and the right drive motor 216. For example, the control unit may send a first signal to the power source 210 to specify the power generation of the power source 210 and receive a second signal representative of the power output by the power source 210. The control unit 232 may also send a third signal to the power transfer device 212 to specify a power range or amount of energy available to the left and right drive motors

214 and 216 and receive a fourth signal representative of the total power being output by the power transfer device 212.

In the current example, the control unit 232 is also communicatively coupled to the left drive motor 214 rand the right drive motor 216 of the steering system 224. For example, the control unit 232 may send a first speed signal to the left drive motor 214 to cause the left drive motor 214 to drive the left propulsion unit 206 in a first specified direction (e.g., forward or backwards) at a first specified rate (or speed) and a second speed signal to the right drive motor 216 to cause the right drive motor 216 to drive the right propulsion unit 208 in a second specified direction at a second specified rate. In this manner, the control unit 232 may control the speed and direction of motion of the vehicle 202. It should be understood, that the first specified direction may differ from the second specified direction, as when the vehicle 202 is turning (e.g., the left propulsion device 206 may move forward and the right propulsion device 208 may move backward to affect a right turn or vice versa to affect a left turn). Similarly, the first specified rate may differ from the second specified rate to angle or adjust the direction of the vehicle 202 (or again to turn the vehicle 202 at a specified rate).

In this example, the control unit 232 is further communicatively coupled to the left propulsion monitoring unit 218 and the right propulsion monitoring unit 220. For example, the left propulsion monitoring unit 218 may provide a signal representative of an actual velocity/rate and direction of propulsion associated with the left propulsion device 206 and the right propulsion monitoring unit 220 may provide a signal representative of an actual velocity/rate and direction of propulsion associated with the right propulsion device 208. For instance, in some cases, the actual conversion of power or energy into forward or backward motion may be greater than or less than expected due to, for example, wear and tear on the system. Thus, in some cases, the control unit 232 may specify parameters to achieve a rate of travel of 15 miles per hours but the actual forward motion may be 14.8 miles per hour. In this case, the control unit 232 may receive the signals from the left propulsion monitoring unit 218 and/or the right propulsion monitoring unit 220 indicating a forward motion of 14.8 miles per hour. In response, the control unit 232 may adjust the power generation associated with the power source 210, the power range associated with the power transfer device 212, or the speed signals delivered to the left drive motor 214 and/or the right drive motor 216 to bring the actual speed of the vehicle 202 up to 15 miles an hour.

Figure 3:
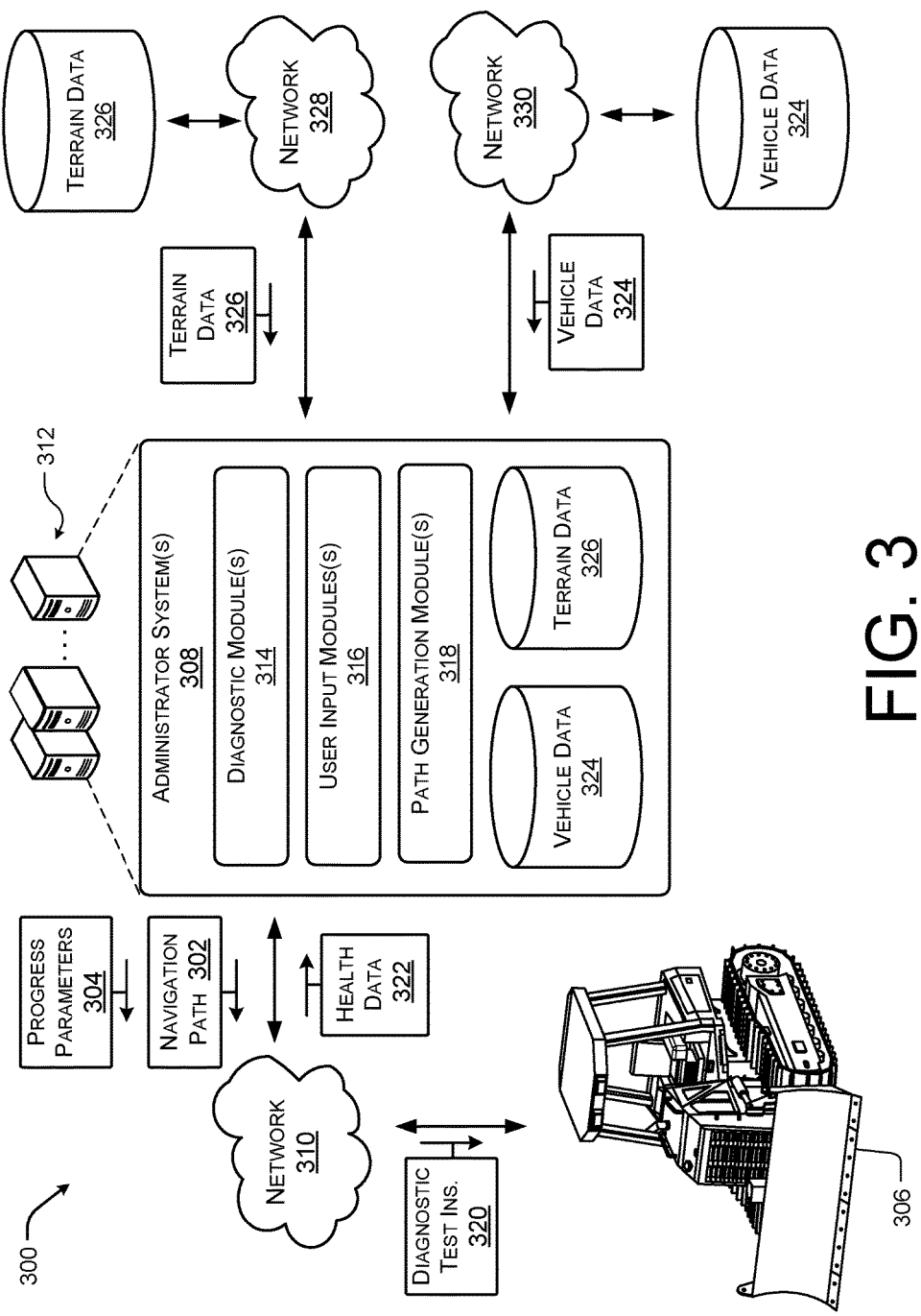
FIG. 3 illustrates an example system for providing navigation path and progress parameters to a vehicle equipped with an autonomous control according to some implementations.

FIG. 3 illustrates an example system 300 for providing navigation path 302 and progress parameters 304 to a vehicle 306 configured for autonomous control according to some implementations. For example, the vehicle 306 may be equipped with a control unit to monitor and control the vehicle's 306 power delivery system and the skid-based steering system. In another example, the vehicle 306 may include a control unit or system, a power delivery system, a skid-based steering system, and a propulsion system configured to provide autonomous movement and control.

In the illustrated example, an administrator system 308 is in communication with a control unit (not shown) of the vehicle 306 via a network 310. In general, the administrator system 308 may allow an operator remote from the vehicle 306 to generate the navigation path 302 and progress parameters 304 to allow the vehicle 306 to operate autonomously. For example, the administrator system 308 may be implemented by one or more servers, such as servers 312. Additionally, the servers 312 may host any number of modules to receive input, collect data, and generate navigation paths 302 and progress parameters 304. In some cases, the modules may include a diagnostic module 314, a user input module 316, a path generation module 318, among others.

The diagnostic module 314 may cause the administrator system 308 to establish a communication channel with the vehicle 306 via the network 310 to check the health of the vehicle 306 and the status and accuracy of the autonomous controls in response to an operator initiating the creation of a navigation path 302. For instance, the diagnostic module 314 may send diagnostic test instructions 320 to the control unit on the vehicle 306 to engage the navigation controls and collect data associated with the functionally of the vehicle 306. After completion of the diagnostic test, the control unit my send heath data 324 associated with the vehicle 306 back to the administrator system 308. In some cases, the health data 324 may include operational status of the vehicle 306, such as green indicators, yellow indicators, and red indictors, maximum speed data, minimum turn radius data, etc. In other cases, the health data 324 may include indications that the left or right propulsion devices are malfunctioning or operating to propel the vehicle 306 at a rate lower or higher than expected given a particular control input.

The user input module 316 may allow the operator to provide inputs into the creation of the navigation path 302 or the progress parameters 304. For example, the user input module 316 may present the operator with selectable options to define or draw the navigation path 302, to input the navigation parameters (e.g., width of the navigation path 302), select a type of navigation, type of activity or operation to be performed (e.g., in the case of a bulldozer, grading, leveling, sloping, etc.), operation preferences (e.g., time limits for the task, fuel usage limits, wear and tear limits, etc.), among others. In some cases, the user input module 316 may allow the operator to select or input various information known about the vehicle 306 or about the terrain and useful for generating the navigation path 302 and the progress parameters 304.

The path generation module 318 is configured to generate the navigation path 302 and the progress parameters 304 based at least in part on the user inputs and the health data 322. For example, the path generation module 318 may modify a path defined or outlined by the operator to increase a turning radius to, thereby, reduce the potential for decoupling a track from the wheel. In another example, the path generation module 318 may alter a route up a steep incline to ensure the vehicle 306 does not become stuck or off course when traversing the incline. In some cases, the path generation module 318 may access vehicle data 324 and/or terrain data 326 to assist with generating the navigation path 302 to comply with the operational preferences input by the operator. For example, the navigation path 302 outlined by the operator may have defined a maneuver or operation that in the past has caused the vehicle 306 to stall. In this example, the path generation module 318 may redefine the maneuver or operation to accomplish the desired task without resulting in the vehicle 306 stalling. In another example, the operator may have defined a path over ground that may not be firm enough to support the weight of the vehicle 306. The path generation module 318 may access the terrain data 326 to determine the firmness of the ground and the vehicle data 324 to determine the weight of the vehicle 306. The path generation module 318 may redefine the route of the vehicle 306 to avoid the hazardous ground or select a different lighter vehicle to perform the task. In some cases, the path generation module 318 may utilize fuzzy logic, machine learning, and/or various user generated tables to assist in finalizing the navigation path 302 and the progress parameters 304 to achieve the desired operation within the desired operation preferences selected by the operator.

In some examples, the path generation module 318 may generate a series of navigation paths 302 that may be used to complete a task or operation associated with the vehicle. For instance, if the vehicle is a bulldozer, the path generation module 318 may generate a collection of navigation paths 302 to cause the vehicle to travel and operate in a slightly overlapping manner. The overlapping nature of the navigation paths 302 ensure that the vehicle covers or levels an entire area without leaving segments untouched. In some cases, the path generation module 318 may even cause the vehicle to traverse the same navigation path 302 multiple time to ensure completion of the task.

In some cases, the administrator system 308 may store the vehicle data 324 and the terrain data 326. However, in other examples, the vehicle data 324 may be stored in a remote database, such as a vehicle capabilities database maintained by the manufacturer of the vehicle 302, and the administrator system 308 may access the vehicle data 324 stored in the database via a network 330. Similarly, the terrain data 326 may be stored in a remote database and the administrator system 308 may access the terrain data 326 stored in the database via a network 328. In the current example, the networks 310, 328, and 330 are shown as different networks. However, in some instances, the networks 310, 328, and 330 may be the same network, such as the Internet.

Once the navigation path 302 and the progress parameters 304 are generated, the administrator system 308 sends the navigation path 302 and the progress parameters 304 to the control unit of the vehicle 306 and the control unit may operate the vehicle 306, as described above with respect to FIGS. 1 and 2.

Figure 4:
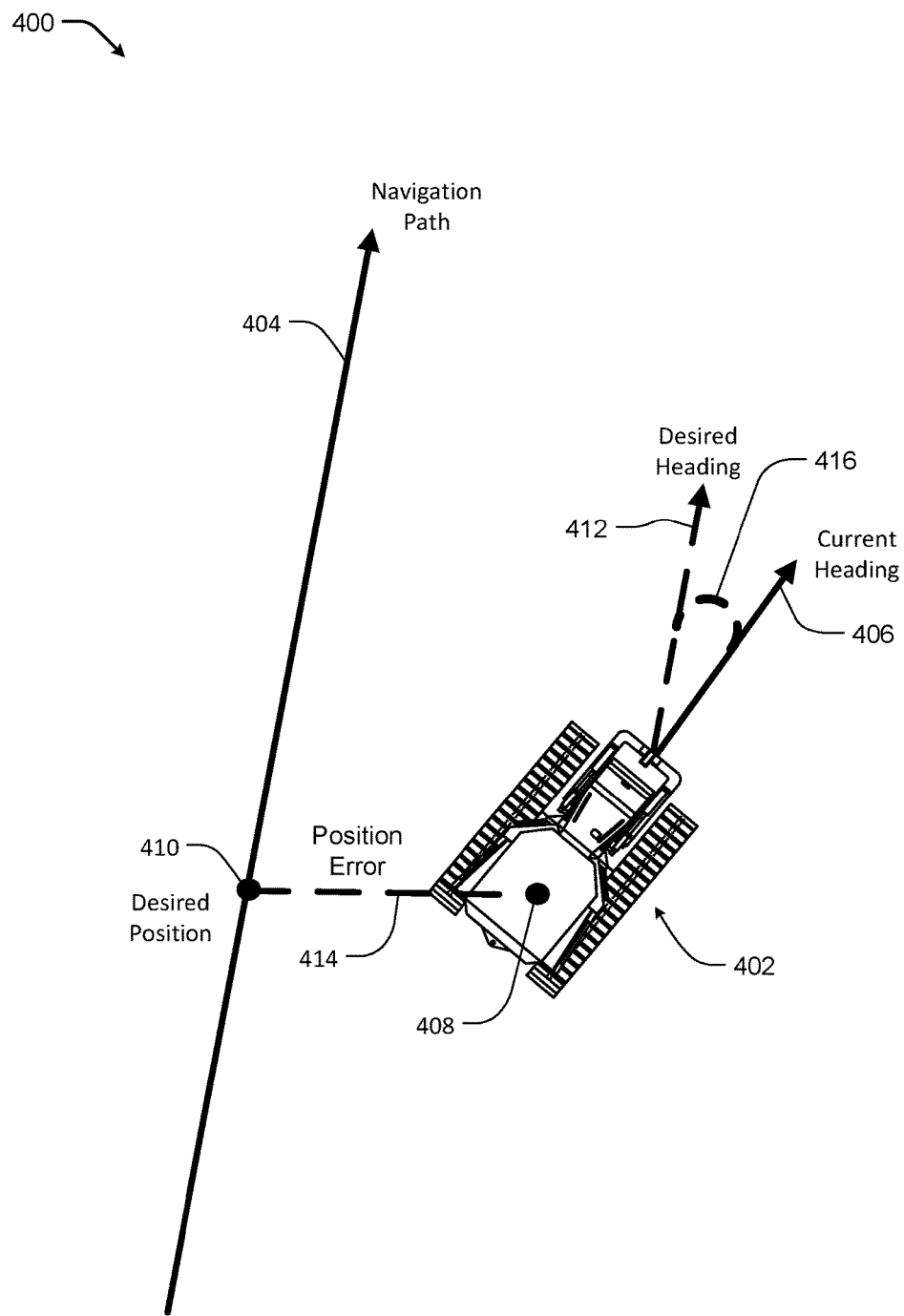
FIG. 4 is example pictorial diagram showing a vehicle deviating from a navigation path according to some implementations.

FIG. 4 is example pictorial diagram 400 showing a vehicle 402 deviating from a navigation path 404 according to some implementations. For example, as illustrated, during operation, the vehicle 402 may slip or deviate from the navigation path 404 provided by the operator or administrator system due to slight variations in the autonomous propulsion system or the skid-based steering system. Thus, the vehicle 402 has a current heading 406 and a current position 408 that differ from a desired position 410 and a desired heading 412. In some cases, the desired position 410 is the closest point along the navigation path 404 to the current position 408 of the vehicle 402 and, in the illustrated example having a straight segment of the navigation path 404, the desired heading 412 is the direction of travel parallel to the navigation path 404.

To steer the vehicle 402 back to the navigation path 404, a control unit mounted or installed on the vehicle 402 may determine a position error 414 and a heading error 416. The position error 414 may be the distance between the desired position 410 and the current position 408. The heading error 416 may be an angle between or associated with the desired heading 412 and the current heading 406. Given the position error 414, the heading error 416, the current position 408, the current heading 406, the progress parameters, and the navigation path 404, the control unit may plot a correction trajectory to steer the vehicle 402 back to the navigation path 404. The correction trajectory may differ from a shortest route back to the navigation path 404 to, for example, reduce wear and tear on the vehicle 402 and/or reduce the amount of turning required to re-establish the navigation path 404 as the current heading and position of the vehicle 402.

In some specific examples, the control unit may make trajectory corrections in near-real-time given, by constantly, consistently, or periodically determining the current position 408, the current heading 406, the position error 414, and the heading error 416. In this example, the control unit may cause the vehicle 402 to make a first correctional movement at a first time, T(1), a second correctional movement at a second time, T(2), etc. until the current heading 406 and the current position 408 of the vehicle 402 are matching the desired heading 412 and the desired position 410 of the navigation path 404 at a time, T(k).

Figure 5:
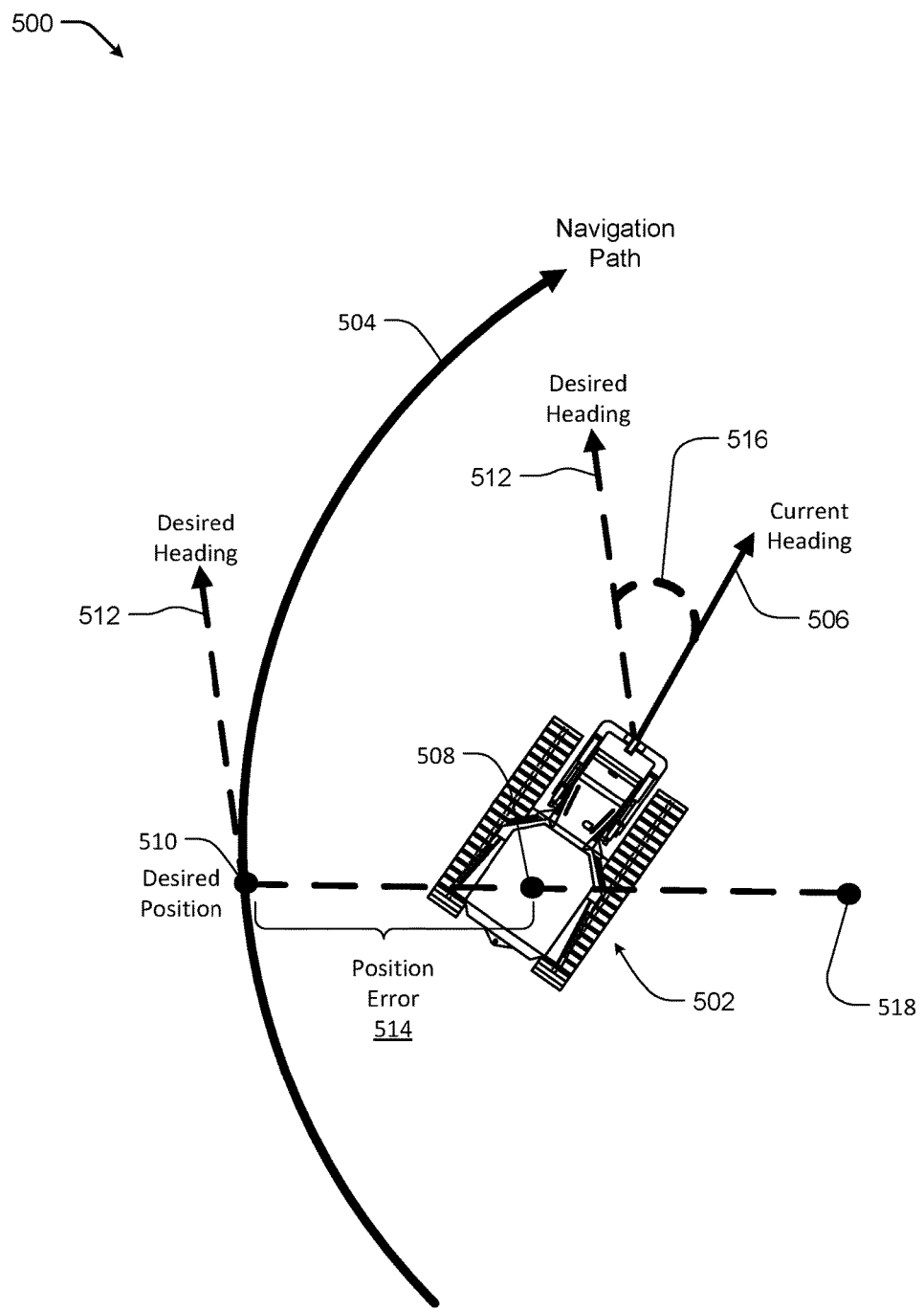
FIG. 5 is another example pictorial diagram showing a vehicle deviating from a navigation path according to some implementations.

FIG. 5 is another example pictorial diagram 500 showing a vehicle 502 deviating from a navigation path 504 according to some implementations. Unlike, FIG. 4, in the current example, the navigation path 504 is curved or arced. In some cases, for navigation purposes the navigation path 504 may be divided into straight segments, such as navigation path 404 of FIG. 4, and curved or arced segments, such as in the current example.

As discussed above, in some cases, the vehicle 502 may slip or deviate from the navigation path 504 during operation. Thus, the vehicle 502 has a current heading 506 and a current position 508 that differ from a desired position 510 and a desired heading 512. In some cases, the desired position 510 is a position on the navigation path 504 identified by a line from a center point 518 of a circle formed by the arc of the navigation path 504 through the current position 508 of the vehicle 502. In the illustrated example having a curved segment of the navigation path 504, the desired heading 512 is a tangent to the arc at the desired position 510 of the navigation path 504.

To steer the vehicle 502 back to the navigation path 504, a control unit mounted or installed on the vehicle 502 may determine a position error 514 and a heading error 516. The position error 514 may be the distance between the desired position 510 and the current position 508. The heading error 516 may be an angle between or associated with the desired heading 512 and the current heading 506. Given the position error 514, the heading error 516, the current position 508, the current heading 506, the progress parameters, and the navigation path 504, the control unit may plot a correction trajectory to steer the vehicle 502 back to the navigation path 504. It should be understood, that the correction trajectory may differ from a shortest route back to the navigation path 504 to, for example, reduce wear and tear on the vehicle 502 and/or reduce the amount of turning required to re-establish the navigation path 504 as the current heading and position of the vehicle 502.

As discussed above, in some specific examples, the control unit may make trajectory corrections in near-real-time given, by constantly, consistently, or periodically determining the current position 508, the current heading 506, the position error 514, and the heading error 516. In this example, the control unit may cause the vehicle 502 to make a first correctional movement at a first time, T(1), a second correctional movement at a second time, T(2), etc. until the current heading 506 and the current position 508 of the vehicle 502 match the desired heading 512 and the desired position 510 of the navigation path 504 at a time, T(k).

FIGS. 6-15 are flow diagrams illustrating example processes associated with utilizing navigation paths and progress parameters to allow a vehicle to perform autonomous functions according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures, or environments.

Figure 6:
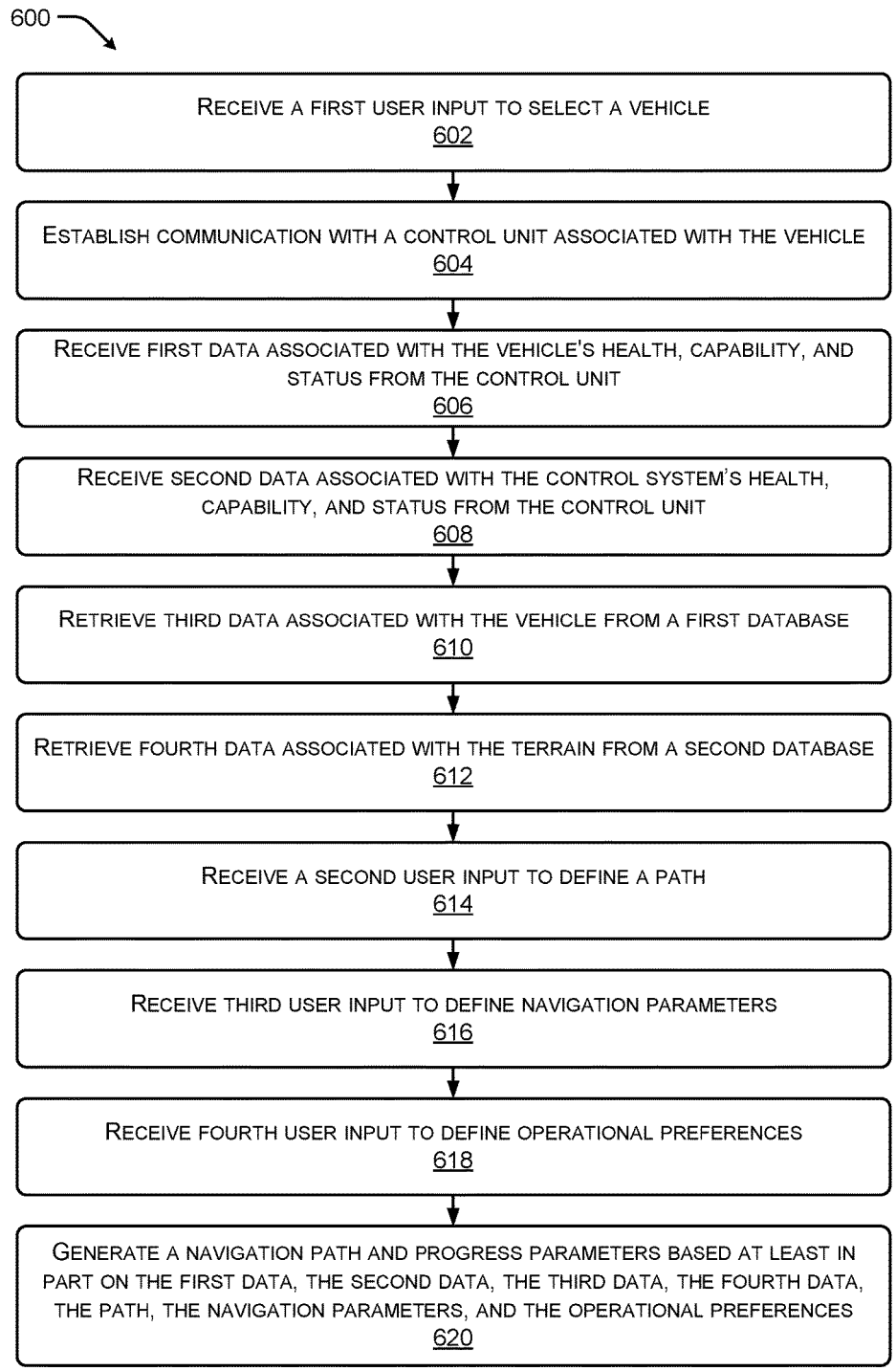
FIG. 6 is example flow diagram showing an illustrative process associated with generating a navigation path and progress parameters according to some implementations.

FIG. 6 is an example flow diagram showing an illustrative process 600 associated with generating a navigation path and progress parameters according to some implementations. As described above, an operator remote from a vehicle may generate a navigation path and progress parameters associated with a task or operation to be performed by the vehicle using an administrator system.

At 602, the administrator system may receive a first user input to select a vehicle. For example, a fleet of vehicles may be available to the administrator system and the operator may select a vehicle based on the type of vehicle, the task to be completed, and the location of the vehicle. For example, a bulldozer may be selected to level terrain while a tractor may be selected to mow grass. In some cases, the vehicle may be selected based on a size of the project and/or a rating of the vehicle.

At 604, the administrator system may establish communication with a control unit associated with the vehicle selected. In some cases, the administrator system may be checking an availability of a communication link to confirm that the control unit is available to receive the navigation path and progress parameters. In other cases, the administrator system may establish communication to receive a health check and operational status report from the control unit to determine the overall functioning status of the vehicle and the autonomous control system.

At 606, the administrator system may receive first data associated with the vehicle's health, capabilities and status from the control unit. For example, the administrator system may provide instructions to the control unit to cause the vehicle to perform a number of maneuvers, while angle acquisition units, positioning units, and propulsion monitoring units collect data associated with the movement of the vehicle in response to the control signals sent by the control unit to a steering system. In some cases, the administrator system may utilize the data collected when generating the navigation path or progress parameters. For instance, when the control unit provides a control signal to cause the vehicle to move at 25 miles per hour and the data collected indicates the vehicle moved at 20 miles an hour, the administrator system may increase the minimum speed by 5 miles to hour.

At 608, the administrator system may receive second data associated with the control system's health, capabilities and status from the control unit. For example, the control unit or another component of the control system may be malfunctioning which would prevent the vehicle from operating as intended by the operator. For example, a positioning unit or angle acquisition unit may have lost accuracy and calibration over time. In these examples, a realignment may need to be applied to bring the positioning unit and angle acquisition unit back to desired level precision level.

At 610, the administrator system may retrieve third data associated with the vehicle from a first database. For example, the administrator system may access information about the capabilities of the vehicle from a database provided by the manufacturer of the vehicle.

At 612, the administrator system may retrieve fourth data associated with the terrain from a second database. For example, the administrator system may access survey information from a database made available by the surveying company or elevation data from an elevation database.

At 614, the administrator system may receive a second user input to define a path or series of paths. For example, the operator may draw or outline a desired course or path using a graphical user interface such as a map displayed by the administrator system including the data retrieved and known about the terrain. In one specific example, the operator may draw or outline a desired boundary (or area) and the administrator system may generate a collection of paths to cause the vehicle to perform an operation associated with the area within the boundary.

At 616, the administrator system may receive a third user input to define navigation parameters. For example, the user may input a width of the navigation path, select a type of operation, a type of navigation, one or more error thresholds, among other navigation parameters.

At 618, the administrator system may receive a fourth user input to define operational preferences. For example, the user may input time limits for the task, fuel usage limits, wear and tear limits, among others.

At 620, the administrator system may generate a navigation path and progress parameters based at least in part on the first data, the second data, the third data, the fourth data, the path defined by the user, the navigation parameters, and the operational preferences. For example, the administrator system may alter the path to avoid obstacles the vehicle may be unable to traverse (e.g., such as a steep incline). In other examples, the administrator system may determine an average speed or default power output based on the fuel efficiency rating and the time limits placed on the administrator system by the user.

Figure 7:
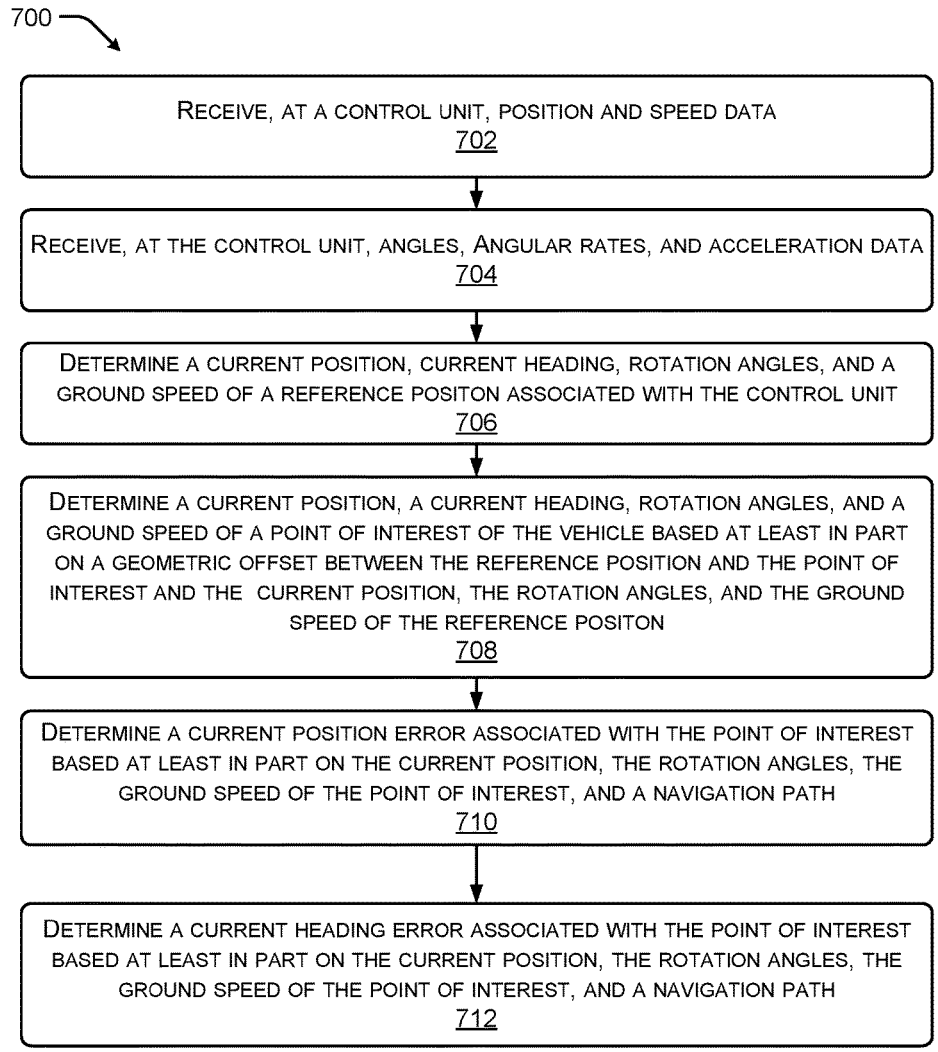
FIG. 7 is example flow diagram showing an illustrative process for determining position, direction, and speed of a vehicle according to some implementations.

FIG. 7 is example flow diagram showing an illustrative process 700 for determining position, direction, and speed of a vehicle according to some implementations. During operation of the vehicle, the control unit may continuously, sporadically, or periodically determines a position, direction, and speed of the vehicle to ensure that the vehicle remains on the navigation path.

At 702, the control unit may receive position and speed data from positioning units installed on the vehicle. For example, the positioning units may send the control unit global positioning data, such as longitude, latitude and altitude, and ground speed decoded from a satellite signal received at the positioning units.

At 704, the control unit may receive angles, angular rates, and acceleration data from angle acquisition units installed on the vehicle. In one example, the angle acquisition units may send the control unit pitch, roll and heading angles, angular rates and accelerations for three axes associated with the vehicle. For instance, the angle acquisition units may include one or more packages of three accelerometers placed orthogonally to each other along an axis, three rate gyroscopes placed orthogonally to each other along an axis, and three magnetometers placed orthogonally to each other along an axis.

At 706, the control unit determines a current position, current heading, rotation angles (e.g., pitch, roll, and yaw angles), and a ground speed of a reference position associated with the control unit. For example, the control unit may fuse the position and speed data and the angles, angular rates, and acceleration data using a Kalman filter to estimate the current position, the rotation angles, and the ground speed of the reference position.

At 708, the control unit may determine a current position, a current heading, rotation angles, and a ground speed of the vehicle at point of interest of the vehicle based at least in part on a geometric offset between the reference position and the point of interest and the current position, the rotation angles, and the ground speed of the reference position. In some cases, using a projection point representative of the vehicle gravitational center along the vehicle's bottom plane as the point of interest provides a more accurate representation of the true position, rotation angles, and ground speed of the vehicle. In one specific example, the control unit may apply a coordinate inference model using the current position, the rotation angles, and the ground speed of the reference position and a stored or known geometric offset between the reference point and the point of interest (e.g., a distance measured during installation) to determine the current position, the rotation angles, and the ground speed of the vehicle at a point of interest of the vehicle.

At 710, the control unit may determine a current position error associated with the point of interest based at least in part on the current position, the rotation angles, the ground speed of the point of interest, and a navigation path. For example, the current position error may be determined by measuring or calculating a lateral offset between the current position of the vehicle and a desired position on the navigation path, as shown above with respect to FIGS. 4 and 5. In one instance, the position error may be calculated by drawing a line from a center point of a circle formed by an arc of a curved segment of the navigation path through the vehicle point of interest. The distance between the vehicle point of interest and a point at which the line from the center point intersects the navigation path may be assigned as the position error. In another instance, such as when the navigation path includes a straight segment, the position error may be a distance between the vehicle point of interest and the closest point on the navigation path.

At 712, the control unit may determine a current heading error associated with the point of interest based at least in part on the current position, the rotation angles, and the ground speed of the point of interest, and a navigation path. For example, the heading error may be determined by identifying a heading associated with the desired position of the vehicle on the navigation path and comparing the heading associated with the desired position of the vehicle with the current heading. In one particular, example, the current heading error is calculated as an angle by subtracting the current heading of vehicle from the desired heading, as discussed above.

Figure 8:
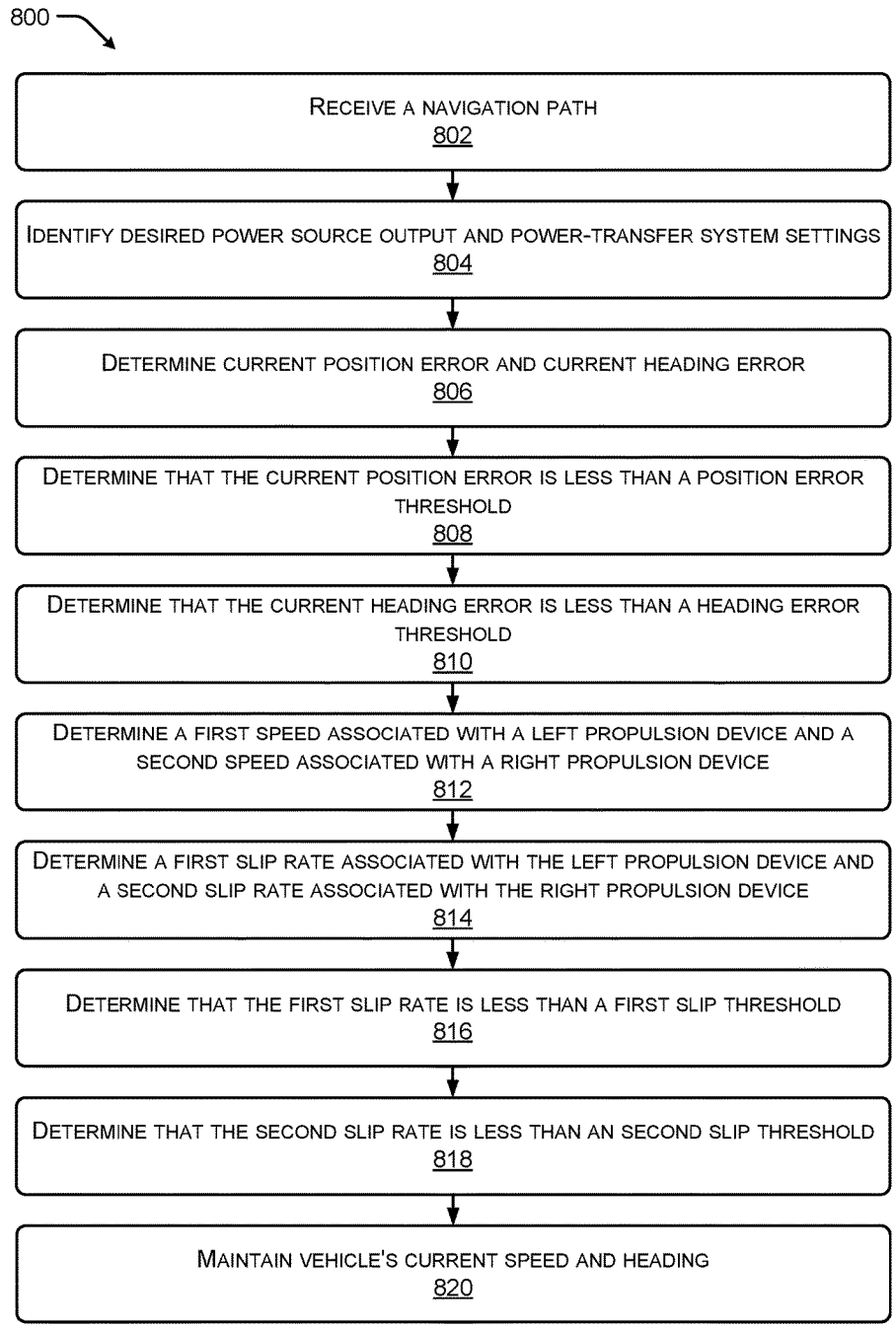
FIG. 8 is example flow diagram showing an illustrative process for determining correction information associated with a vehicle's trajectory according to some implementations.

FIG. 8 is example flow diagram showing an illustrative process 800 for determining correction information associated with a vehicle's trajectory according to some implementations. As discussed above, the vehicle may slip or detour from the navigation path at various times during operation.

At 802, a control unit of the vehicle may receive a navigation path from the administrator system. In some cases, the navigation path may include one or more progress parameters associated with the task or activity the vehicle is to perform, such as grading, leveling, etc. along the navigation path. As discussed above, the navigation path may include straight segments and arced or curved segments.

At 804, the control unit may identify a desired power source output and power-transfer system settings associated with the task or activity. For example, the progress parameters may include preferred transmission gear selections, hydraulic pump displacement or electric motor controller stings. In other examples, the control unit may determine the desired power source output and the power-transfer system settings based on the navigation path, terrain data, and progress parameters.

At 806, the control unit determines the current position error and the current heading error associated with the vehicle. In some examples, the control unit may determine the current position error associated with the point of interest of the vehicle based at least in part on the current position, the rotation angles, the ground speed of the vehicle, and a navigation path. For example, the current position error may be determined by measuring or calculating a lateral offset between the current position of the vehicle and a desired position on the navigation path. In one instance, the position error may be calculated by drawing a line from a center point of a circle formed by an arc of a curved segment of the navigation path through the vehicle's point of interest. The distance between the point of interest and a point at which the line from the center point intersects the navigation path may be assigned as the position error, as illustrated above with respect to FIG. 5. In another instance, such as when the navigation path includes a straight segment, the position error may be a distance between the vehicle point of interest and the closest point on the navigation path, as illustrated above with respect to FIG. 4.

The control unit may also determine the current heading error associated with the point of interest based at least in part on the current position, the rotation angles, and the ground speed at the point of interest, and a navigation path. For example, the heading error may be determined by identifying a heading associated with the desired position of the vehicle on the navigation path and comparing the heading associated with the desired position of the vehicle with the current heading. In one particular, example, the current heading error is calculated as an angle by subtracting the current heading of vehicle from the desired heading (e.g., a tangent to the desired position on the navigation path as illustrated above with respect to FIG. 5).

At 808, the control unit may determine that the position error is less than a position error threshold. For example, if the position error is off by less than three feet in either direction (e.g., to the left or right of the desired position) the vehicle may be within an acceptable range to perform the operation (e.g., mowing the grass) associated with the navigation path and, thus, no course correction may be necessary.

At 810, the control unit may determine that the heading error is less than a heading error threshold. For example, if the position error is off by less than three feet and the heading error is less than two degrees in either direction (e.g., to the left or right of the desired position) the vehicle may stay within the acceptable range for an extended period of time and, thus, no course correction may be necessary.

At 812, the control unit may determine a first speed associated with a left propulsion device and a second speed associated with a right propulsion device. For example, since skid-based steering may be utilized by the vehicle, the left propulsion device and the right propulsion device may be able to operate to propel the vehicle at different velocities, so the control unit may determine both the first speed and the second speed. In some cases, the first speed and the second speed may be obtained by left and right propulsion monitoring units electrically or mechanically coupled to the left and right drive motors.

At 814, the control unit may determine a first slip rate associated with the left propulsion device and a second lip rate associated with the right propulsion device. For example, many vehicles that utilize skid-based steering employ a track based propulsion system. In some cases, the track may slip with respect to the drive wheels due to various factors, such as terrain, wheel speed, wheel and/or track conditions (e.g., maintenance, lubrication levels, etc.). Again, as the left propulsion device and the right propulsion device may be able to operate to propel the vehicle at different velocities, the slip rate associated with the left and right propulsion devices may also differ.

At 816, the control unit may determine that the first slip rate is less than a first slip threshold associated with the left propulsion device. For example, a speed or velocity may be adjusted when the slip rate is greater than the threshold to improve overall operation of the vehicle and reduce wear and tear on the track and wheels. However, in the current example, as the first slip rate is less than the first slip threshold no speed or velocity adjustment may be necessary.

At 818, the control unit may determine that the second slip rate is less than a second slip threshold associated with the left propulsion device. In some cases, the first slip threshold and the second slip threshold may be the same. However, in other cases, the first slip threshold and the second slip threshold may differ depending on the age of each track, each drive wheel, etc. For example, a newer tack may be able to operate within normal parameters when a higher slip rate is experienced. Again, as the second slip rate is less than the second slip threshold no speed or velocity adjustment may be necessary.

At 820, the control unit may maintain the current speed and heading of the vehicle at the current time. The control unit may then return to 806 and determine a new position error and a new heading error based on an updated current position and an updated current heading. In some implementations, the control unit may periodically, consistently, or constantly determine speed and/or heading adjustments based on updated position and heading information collected via angle acquisition units and positioning units as well as speed and velocity information collected by the left and right propulsion monitoring units.

Figure 9:
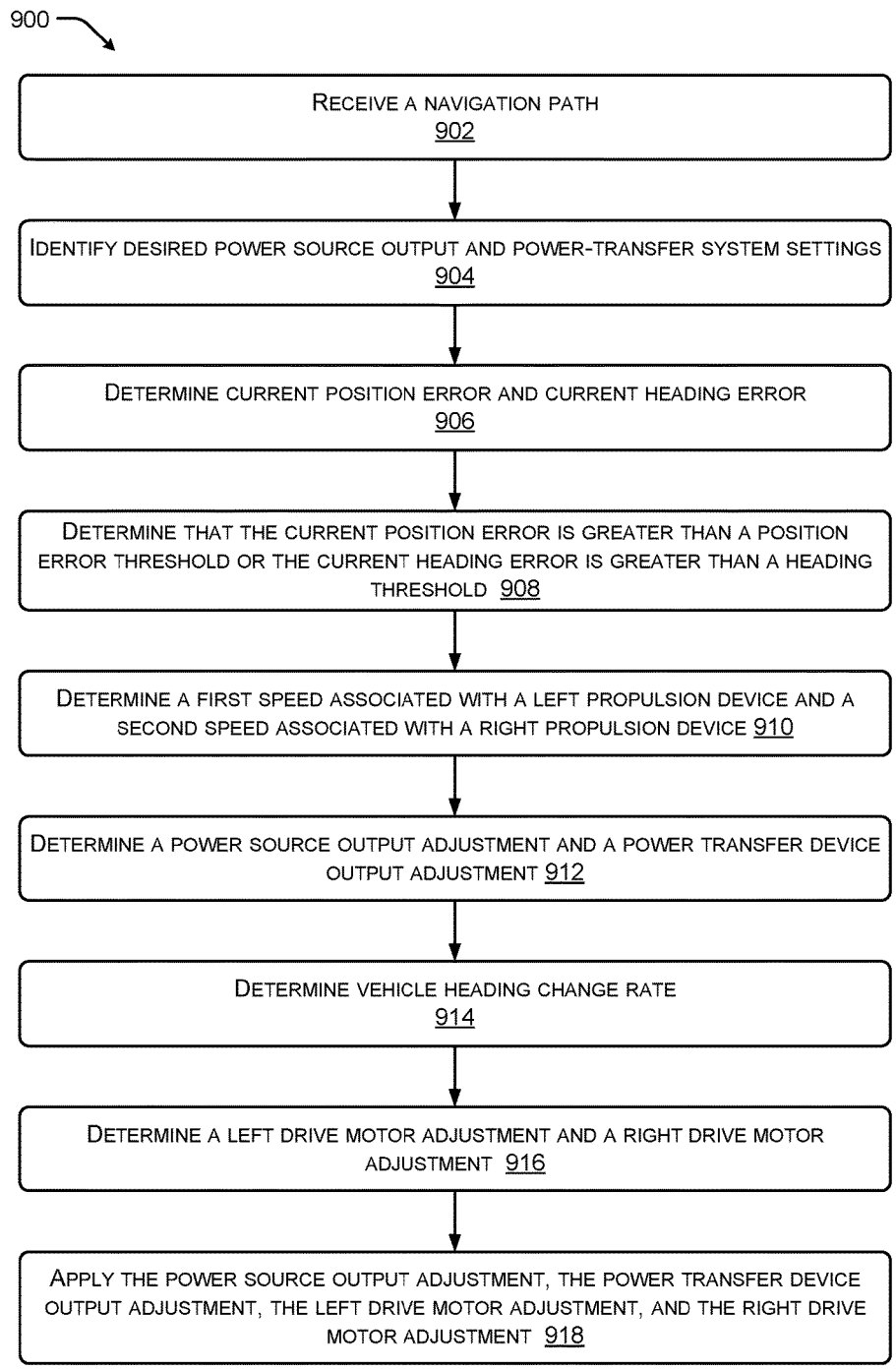
FIG. 9 is another example flow diagram showing an illustrative process for determining correction information associated with a vehicle's trajectory according to some implementations.

FIG. 9 is another example flow diagram showing an illustrative process 900 for determining correction information associated with a vehicle's trajectory according to some implementations. As discussed above, the vehicle may slip or detour from the navigation path at various times during operation.

At 902, a control unit of the vehicle may receive a navigation path from the administrator system. In some cases, the navigation path may include one or more progress parameters associated with the task or activity the vehicle is to perform, such as grading, leveling, etc. along the navigation path. As discussed above, the navigation path may include straight segments and arced or curved segments.

At 904, the control unit may identify a desired power source output and power-transfer system settings associated with the task or activity. For example, the progress parameters may include preferred transmission gear selections, hydraulic pump displacement or electric motor controller signals. In other examples, the control unit may determine the desired power source output and the power-transfer system settings based on the navigation path, terrain data, and progress parameters.

At 906, the control unit determines the current position error and the current heading error associated with the vehicle. In some examples, the control unit may determine the current position error associated with the point of interest of the vehicle based at least in part on the current position, the rotation angles, the ground speed of the vehicle, and a navigation path. For example, the current position error may be determined by measuring or calculating a lateral offset between the current position of the vehicle and a desired position on the navigation path. In one instance, the position error may be calculated by drawing a line from a center point of a circle formed by an arc of a curved segment of the navigation path through the vehicle's point of interest. The distance between the point of interest and a point at which the line from the center point intersects the navigation path may be assigned as the position error, as illustrated above with respect to FIG. 5. In another instance, such as when the navigation path includes a straight segment, the position error may be a distance between the vehicle point of interest and the closest point on the navigation path, as illustrated above with respect to FIG. 4.

The control unit may also determine the current heading error associated with the point of interest based at least in part on the current position, the rotation angles, and the ground speed of the point of interest, and a navigation path. For example, the heading error may be determined by identifying a heading associated with the desired position of the vehicle on the navigation path and comparing the heading associated with the desired position of the vehicle with the current heading. In one particular, example, the current heading error is calculated as an angle by subtracting the current heading of vehicle from the desired heading (e.g., a tangent to the desired position on the navigation path as illustrated above with respect to FIG. 5).

At 908, the control unit may determine that the position error is greater than an error threshold or that the heading error is greater than a heading error threshold. For example, if the position error is off by greater than two feet or the heading error is greater than five degrees in either direction (e.g., to the left or right of the desired position) the vehicle may be outside an acceptable range for the selected activity, task, or operation and course correction may be desired.

At 910, the control unit may determine a first speed associated with a left propulsion device and a second speed associated with a right propulsion device. For example, since skid-based steering may be utilized by the vehicle, the left propulsion device and the right propulsion device may be able to operate to propel the vehicle at different velocities, so the control unit may determine both the first speed and the second speed. In some cases, the first speed and the second speed may be obtained by left and right propulsion monitoring units electrically or mechanically coupled to the left and right drive motors. In one example, the control unit may calculate the ground linear/actual speed of the left and right propulsion devices by converting the signals sent from propulsion monitoring units into actual ground velocity. By comparing the current overall ground speed and current propulsion actual ground speed, the propulsion device slip rate may be determined by the control unit.

At 912, the control unit may determine a power source output adjustment and/or a power transfer device output adjustment. For example, the control unit may adjust the speed associated with either the left or right propulsion device propelling the vehicle by adjusting the power received by the left and/or right propulsion devices via the power source output or the power transfer device output.

The change in speed may be to cause the vehicle to initiate a course correction to return the vehicle to the navigation path.

At 914, the control unit may determine the vehicle heading change rate. For example, the left propulsion device may be propelling the vehicle at a greater velocity than the right propulsion device causing the vehicle to turn to the right. In this manner, the vehicle may be veering to the right and causing an increase in the heading error as the vehicle heads farther and farther away from the desired heading. In some cases, the control unit may monitor the heading rate change to determine if the current heading is moving back in line with the desired heading of the navigation path or away from the desired heading.

In another instance, the vehicle heading change rate may be utilized as a representation of the momentum of the vehicle's steering. For example, as the vehicle steers back to the desired position, the vehicle may, in some cases, steer too fast and the vehicle may overshoot (e.g., be off the navigation path in the opposite direction) the desired position. Therefore, the control unit may continuously monitor the heading change rate of the vehicle and if the heading change rate is greater than a threshold (e.g., is too high), issue a negative steer command in order to steer the vehicle in a direction to prevent overshot.

At 916, the control unit may cause a left drive motor adjustment and/or a right drive motor adjustment. For example, the control unit may make a course correction or heading correction to cause the vehicle to move closer to a desired position on the navigation path. In doing so, the control unit may adjust the power output by the left and/or the right drive motor.

At 918, the control unit may apply the power source output adjustment, the power transfer device output adjustment, the left drive motor adjustment, and/or the right drive motor adjustment to cause the vehicle to execute a course correction or change in trajectory to propel the vehicle back to a desired position associated with the navigation path. It should be understood, that the control unit may not necessarily apply all of the power source output adjustment, the power transfer device output adjustment, the left drive motor adjustment, and/or the right drive motor adjustment to alter the course of the vehicle. Rather, the control unit may apply one or more of the power source output adjustment, the power transfer device output adjustment, the left drive motor adjustment, and/or the right drive motor adjustment. Additionally, the control unit may periodically, constantly, or at various intervals perform the process 900 to correct the course of the vehicle. For example, the control unit may apply a first set of adjustments at a time T(1), a second set of adjustments at a time T(2), . . . . Until at a time T(N) the vehicle's heading error is within the heading thresholds and the position error is within the position thresholds.

Figure 10:
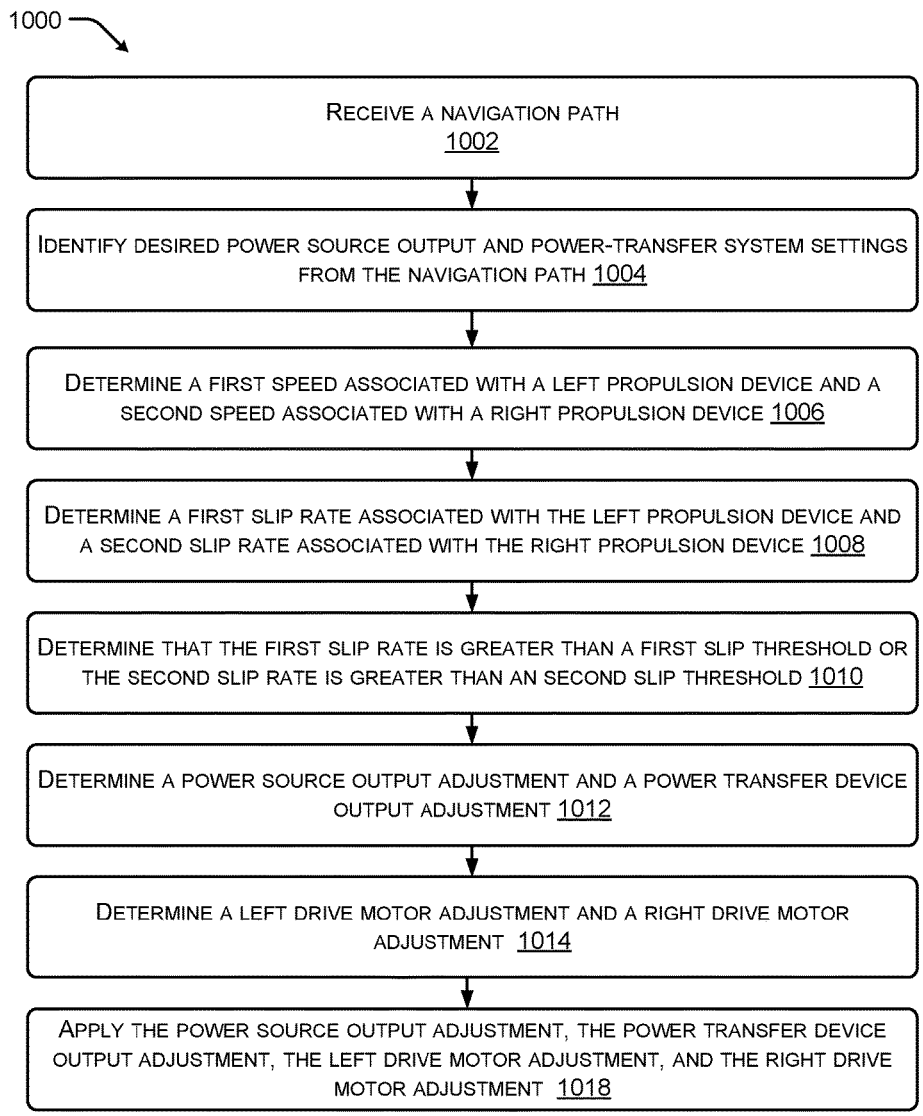
FIG. 10 is an example flow diagram showing an illustrative process for determining the vehicle is operating within desired parameters according to some implementations.

FIG. 10 is an example flow diagram showing an illustrative process 1000 for determining that the vehicle is operating within desired parameters according to some implementations. For instance, the vehicle may experience wheel and track slipping or other undesirable performance during operation that may require an adjustment to the speed, velocity, acceleration, or heading of the vehicle. In some examples, the wheel and track slipping may be caused by soft or wet ground, resistive forces caused by an operations (such as moving terrain), At 1002, a control unit of the vehicle may receive a navigation path from the administrator system. In some cases, the navigation path may include one or more progress parameters associated with the task or activity the vehicle is to perform, such as grading, leveling, etc. along the navigation path. As discussed above, the navigation path may include straight segments and arced or curved segments.

At 1004, the control unit may identify a desired power source output and power-transfer system settings associated with the task or activity. For example, the progress parameters may include preferred transmission gear selections, hydraulic pump displacement or electric motor controller signals. In other examples, the control unit may determine the desired power source output and the power-transfer system settings based on the navigation path, terrain data, and progress parameters.

At 1006, the control unit may determine a first speed associated with a left propulsion device and a second speed associated with a right propulsion device. For example, since skid-based steering may be utilized by the vehicle, the left propulsion device and the right propulsion device may be able to operate to propel the vehicle at different velocities, so the control unit may determine both the first speed and the second speed. In some cases, the first speed and the second speed may be obtained by left and right propulsion monitoring unit electrically or mechanically coupled to the left and right drive motors. In one example, the control unit may calculate the ground linear/actual speed of the left and right propulsion devices by converting the signals sent from propulsion monitoring units into actual ground velocity. By comparing the current overall ground speed and current propulsion actual ground speed, the propulsion device slip rate may be determined by the control unit.

At 1008, the control unit may determine a first slip rate associated with the left propulsion device and a second slip rate associated with the right propulsion device. For example, many vehicles that utilize skid-based steering employ a track based propulsion system. In some cases, the track may slip with respect to the drive wheels due to various factors, such as terrain, wheel speed, wheel and/or track conditions (e.g., maintenance, lubrication levels, etc.). Again, as the left propulsion device and the right propulsion device may be able to operate to propel the vehicle at different velocities the slip rate associated with the left and right propulsion devices may also differ.

At 1010, the control unit may determine that the first slip rate is greater than a first slip threshold associated with the left propulsion device or the second slip rate is greater than a second slip threshold associated with the left propulsion device. For example, a speed or velocity may be adjusted when one of the slip rates is greater than the threshold to improve overall operation of the vehicle and reduce wear and tear on the track and wheels. In some cases, the first slip threshold and the second slip threshold may be the same. However, in other cases, the first slip threshold and the second slip threshold may differ depending on the age of each track, each drive wheel, etc. For example, a newer track may be able to operate within normal parameters when a higher slip rate is experienced.

At 1012, the control unit may determine a power source output adjustment and/or a power transfer device output adjustment. For example, the control unit may adjust the speed associated with either the left or right propulsion device propelling the vehicle by adjusting the power received by the left and/or right propulsion devices via the power source output or the power transfer device output to reduce the slipping of the track over the wheels. As an illustrative example, if the vehicle is a car or truck driving on a soft, wet, or muddy road, the control unit may shift the transmission to a low gear (e.g., reduce the speed of the vehicle) to maintain a steady movement and to prevent undesired wheel slip.

At 1014, the control unit may cause a left drive motor adjustment and/or a right drive motor adjustment. For example, the control unit may make a speed or velocity change to the left or right propulsion devices to reduce the slip rate associated with the corresponding track. Additionally, the adjustment to the speed or velocity of the left or right propulsion devices may result in a change of direction to help the vehicle locate a position where the contact with the ground provides improved traction, thereby reducing slip.

At 1016, the control unit may apply the power source output adjustment, the power transfer device output adjustment, the left drive motor adjustment, and/or the right drive motor adjustment to cause the vehicle to execute a change in velocity or a reduction in the slip rate. It should be understood, that the control unit may not necessarily apply all of the power source output adjustment, the power transfer device output adjustment, the left drive motor adjustment, and/or the right drive motor adjustment to alter the course of the vehicle. Rather, the control unit may apply one or more of the power source output adjustment, the power transfer device output adjustment, the left drive motor adjustment, and/or the right drive motor adjustment.

At 1018, the control unit may apply the power source output adjustment, the power transfer device output adjustment, the left drive motor adjustment, and/or the right drive motor adjustment to cause the vehicle to execute a course correction, change in trajectory, or reduction in slip rate. It should be understood, that the control unit may not necessarily apply all of the power source output adjustment, the power transfer device output adjustment, the left drive motor adjustment, and/or the right drive motor adjustment to alter the course of the vehicle. Rather, the control unit may apply one or more of the power source output adjustment, the power transfer device output adjustment, the left drive motor adjustment, and/or the right drive motor adjustment. Additionally, the control unit may periodically, constantly, or at various intervals perform the process 1000 to correct the course of the vehicle. For example, the control unit may apply a first set of adjustments at a time T(1), a second set of adjustments at a time T(2), . . . . Until at a time T(N) the vehicle's heading error is within the heading thresholds and the position error is within the position thresholds.

Figure 11:
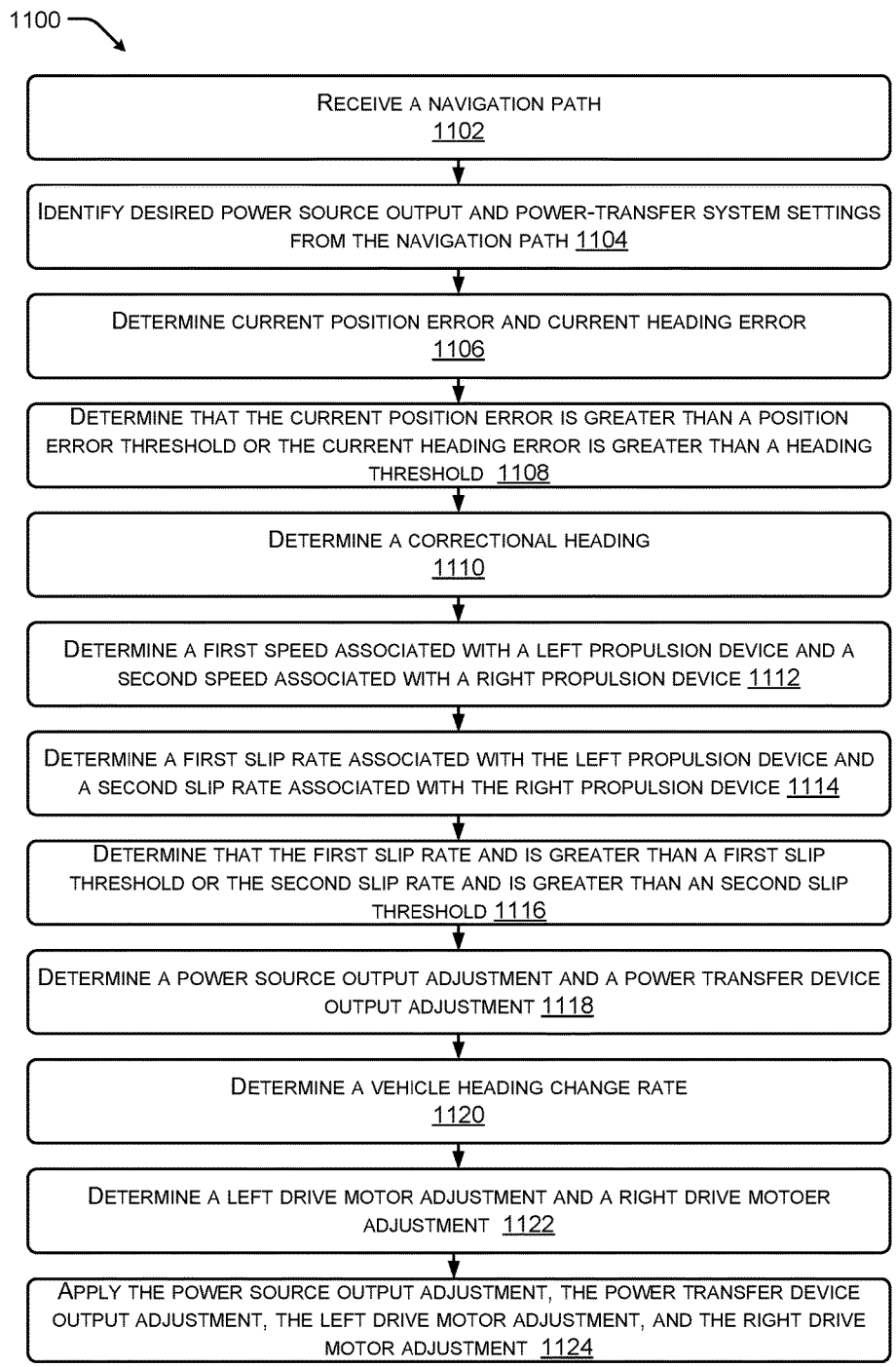
FIG. 11 is an example flow diagram showing an illustrative process for determining correction information associated with a vehicle's trajectory and speed according to some implementations.

FIG. 11 is an example flow diagram showing an illustrative process 1100 for determining correction information associated with a vehicle's trajectory and speed according to some implementations. For instance, in some cases, the heading, position, and or the slip rate of the left or right propulsion device may have to be concurrently adjusted during operation.

At 1102, a control unit of the vehicle may receive a navigation path from the administrator system. In some cases, the navigation path may include one or more progress parameters associated with the task or activity the vehicle is to perform, such as grading, leveling, etc. along the navigation path. As discussed above, the navigation path may include straight segments and arced or curved segments.

At 1104, the control unit may identify a desired power source output and power-transfer system settings associated with the task or activity. For example, the progress parameters may include preferred transmission gear selections, hydraulic pump displacement or electric motor controller signals. In other examples, the control unit may determine the desired power source output and the power-transfer system settings based on the navigation path, terrain data, and progress parameters.

At 1106, the control unit determines the current position error and the current heading error associated with the vehicle. In some examples, the control unit may determine the current position error associated with the point of interest of the vehicle based at least in part on the current position, the rotation angles, the ground speed of the vehicle, and a navigation path. For example, the current position error may be determined by measuring or calculating a lateral offset between the current position of the vehicle and a desired position on the navigation path. In one instance, the position error may be calculated by drawing a line from a center point of a circle formed by an arc of a curved segment of the navigation path through the vehicle's point of interest. The distance between the point of interest and a point at which the line from the center point intersects the navigation path may be assigned as the position error, as illustrated above with respect to FIG. 5. In another instance, such as when the navigation path includes a straight segment, the position error may be a distance between the vehicle point of interest and the closest point on the navigation path, as illustrated above with respect to FIG. 4.

At 1108, the control unit may determine that the position error is greater than a position error threshold or that the heading error is greater than a heading error threshold. For example, if the position error is off by greater than two feet or the heading error is greater than five degrees in either direction (e.g., to the left or right of the desired position) the vehicle may stay be outside an acceptable range for the selected activity, task, or operation and course correction may be desired.

At 1110, the control unit may determine a correction heading based at least in part on the position error and the heading error. For example, the correction heading may be a correction trajectory or path that will take the vehicle back in-line with the navigation path given the progress parameters (e.g., the path to take the vehicle back to the navigation path without burning more than a specific amount of fuel). In other examples, the correction heading may be a single operation of the vehicle to adjust the heading and/or velocity to begin to move the vehicle back in-line with the navigation path. In this example, the control unit may make near constant course adjustments to cause the vehicle to follow a path similar to a correction trajectory or path. In one implementation, the correction heading may be calculated at each time step K in a dynamic approach. For instance, at time 1, based on the current position and heading errors, the correction heading may be 60 degrees. At time 2, the vehicle has been moved along the correction trajectory for a specified time interval, therefore the position and heading errors may have been reduced (or intensified), and based on the updated position and heading errors, the control unit may calculate another correction heading, for instance 45 degrees. Then at time 3, the correction heading may change to 20 degrees etc. until the vehicle has returned to the desired heading and position.

At 1112, the control unit may determine a first speed associated with a left propulsion device and a second speed associated with a right propulsion device. For example, since skid-based steering may be utilized by the vehicle, the left propulsion device and the right propulsion device may be able to operate to propel the vehicle at different velocities, so the control unit may determine both the first speed and the second speed. In some cases, the first speed and the second speed may be obtained by left and right propulsion monitoring units electrically or mechanically coupled to the left and right drive motors. In one example, the control unit may calculate the ground linear/actual speed of the left and right propulsion devices by converting the signals sent from propulsion monitoring units into actual ground velocity. By comparing the current overall ground speed and current propulsion actual ground speed, the propulsion device slip rate may be determined by the control unit.

At 1114, the control unit may determine a first slip rate associated with the left propulsion device and a second slip rate associated with the right propulsion device. For example, many vehicles that utilize skid-based steering employ a track based propulsion system. In some cases, the track may slip with respect to the drive wheels due to various factors, such as terrain, wheel speed, wheel and/or track conditions (e.g., maintenance, lubrication levels, etc.). Again, as the left propulsion device and the right propulsion device may be able to operate to propel the vehicle at different velocities the slip rate associated with the left and right propulsion devices may also differ.

At 1116, the control unit may determine that the first slip rate is greater than a first slip threshold associated with the left propulsion device or the second slip rate is greater than a second slip threshold associated with the left propulsion device. For example, a speed or velocity may be adjusted when one of the slip rates is greater than the threshold to improve overall operation of the vehicle and reduce wear and tear on the track and wheels. In some cases, the first slip threshold and the second slip threshold may be the same. However, in other cases, the first slip threshold and the second slip threshold may differ depending on the age of each track, each drive wheel, etc. For example, a newer track may be able to operate within normal parameters when a higher slip rate is experienced.

At 1118, the control unit may determine a power source output adjustment and/or a power transfer device output adjustment. For example, the control unit may adjust the speed associated with either the left or right propulsion device propelling the vehicle by adjusting the power received by the left and/or right propulsion devices via the power source output or the power transfer device output to reduce the slipping of the track over the wheels.

At 1120, the control unit may determine the vehicle heading change rate. For example, the left propulsion device may be propelling the vehicle at a greater velocity than the right propulsion device causing the vehicle to turn to the right. In this manner, the vehicle may be veering to the right and causing an increase in the heading error as the vehicle heads farther and farther away from the desired heading. In some cases, the control unit may monitor the heading rate change to determine if the current heading is moving back in line with the desired heading of the navigation path or away from the desired heading.

In another instance, the vehicle heading change rate may be utilized as a representation of the momentum of the vehicle's steering. For example, as the vehicle steers back to the desired position, the vehicle may, in some cases, steer too fast and the vehicle may overshoot (e.g., be off the navigation path in the opposite direction) the desired position. Therefore, the control unit may continuously monitor the heading change rate of the vehicle and if the heading change rate is greater than a threshold (e.g., is too high), issue a negative steer command in order to steer the vehicle in a direction to prevent overshot.

At 1122, the control unit may cause a left drive motor adjustment and/or a right drive motor adjustment. For example, the control unit may make a course correction or heading correction to cause the vehicle to move closer to a desired position on the navigation path. In doing so, the control unit may adjust the power output by the left and/or the right drive motor.

At 1024, the control unit may apply the power source output adjustment, the power transfer device output adjustment, the left drive motor adjustment, and/or the right drive motor adjustment to cause the vehicle to execute a course correction, change in trajectory, or reduction in slip rate. It should be understood, that the control unit may not necessarily apply all of the power source output adjustment, the power transfer device output adjustment, the left drive motor adjustment, and/or the right drive motor adjustment to alter the course of the vehicle. Rather, the control unit may apply one or more of the power source output adjustment, the power transfer device output adjustment, the left drive motor adjustment, and/or the right drive motor adjustment. Additionally, the control unit may periodically, constantly, or at various intervals perform the process 1100 to correct the course of the vehicle. For example, the control unit may apply a first set of adjustments at a time T(1), a second set of adjustments at a time T(2), . . . . Until at a time T(N) the vehicle's heading error is within the heading thresholds and the position error is within the position thresholds.

Figure 12:
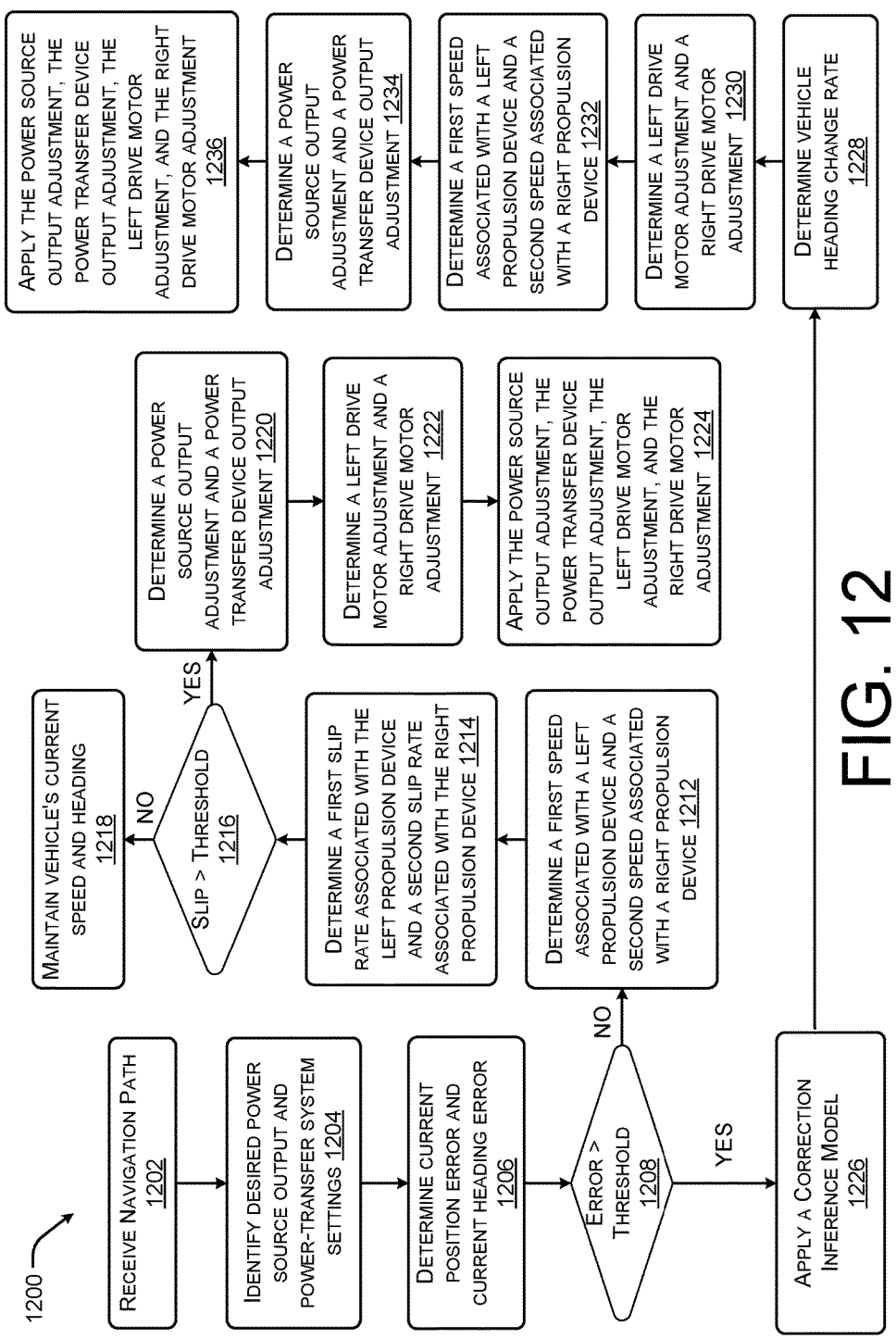
FIG. 12 is another example flow diagram showing an illustrative process for determining correction information associated with a vehicle's trajectory and speed according to some implementations.

FIG. 12 is another example flow diagram showing an illustrative process 1200 for determining correction information associated with a vehicle's trajectory and speed according to some implementations. For instance, in some cases, the heading, position, and or the slip rate of the left or right propulsion devices may have to be concurrently adjusted during operation.

At 1202, a control unit of the vehicle may receive a navigation path from the administrator system. In some cases, the navigation path may include one or more progress parameters associated with the task or activity the vehicle is to perform, such as grading, leveling, etc. along the navigation path. As discussed above, the navigation path may include straight segments and arced or curved segments.

At 1204, the control unit may identify a desired power source output and power-transfer system settings associated with the task or activity. For example, the progress parameters may include preferred transmission gear selections, hydraulic pump displacement or electric motor controller stings. In other examples, the control unit may determine the desired power source output and the power-transfer system settings based on the navigation path, terrain data, and progress parameters.

At 1206, the control unit determines the current position error and the current heading error associated with the vehicle. In some examples, the control unit may determine the current position error associated with the point of interest of the vehicle based at least in part on the current position, the rotation angles, the ground speed of the vehicle, and a navigation path. For example, the current position error may be determined by measuring or calculating a lateral offset between the current position of the vehicle and a desired position on the navigation path. In one instance, the position error may be calculated by drawing a line from a center point of a circle formed by an arc of a curved segment of the navigation path through the vehicle's point of interest. The distance between the point of interest and a point at which the line from the center point intersects the navigation path may be assigned as the position error, as illustrated above with respect to FIG. 5. In another instance, such as when the navigation path includes a straight segment, the position error may be a distance between the vehicle point of interest and the closest point on the navigation path, as illustrated above with respect to FIG. 4.

At 1208, the control unit may determine if the position error is greater than an error threshold or that the heading error is greater than a heading error threshold. For example, if the position error is off by greater than two feet or the heading error is greater than five degrees in either direction (e.g., to the left or right of the desired position) the vehicle may be outside an acceptable range for the selected activity, task, or operation and course correction may be desired. In this example, if the position error is less than the error threshold and the heading error is less than the heading error threshold, the process 1200 proceeds to 1212.

At 1212, the control unit may determine a first speed associated with a left propulsion device and a second speed associated with a right propulsion device. For example, since skid-based steering may be utilized by the vehicle, the left propulsion device and the right propulsion device may be able to operate to propel the vehicle at different velocities, so the control unit may determine both the first speed and the second speed. In some cases, the first speed and the second speed may be obtained by left and right propulsion monitoring units electrically or mechanically coupled to the left and right drive motors. In one example, the control unit may calculate the ground linear/actual speed of the left and right propulsion devices by converting the signals sent from propulsion monitoring units into actual ground velocity. By comparing the current overall ground speed and current propulsion actual ground speed, the propulsion device slip rate may be determined by the control unit.

At 1214, the control unit may determine a first slip rate associated with the left propulsion device and a second lip rate associated with the right propulsion device. For example, many vehicles that utilize skid-based steering employ a track based propulsion system. In some cases, the track may slip with respect to the drive wheels due to various factors, such as terrain, wheel speed, wheel and/or track conditions (e.g., maintenance, lubrication levels, etc.). Again, as the left propulsion device and the right propulsion device may be able to operate to propel the vehicle at different velocities the slip rate associated with the left and right propulsion devices may also differ.

At 1216, the control unit may determine if the first slip rate is greater than a first slip threshold associated with the left propulsion device or the second slip rate is greater than a second slip threshold associated with the left propulsion device. For example, a speed or velocity may be adjusted when one of the slip rates is greater than the threshold to improve overall operation of the vehicle and reduce wear and tear on the track and wheels. If the control unit determines that the first slip rate is less than the first slip threshold associated with the left propulsion device and the second slip rate is less than the second slip threshold associated with the left propulsion device, the process 1200 proceeds to 1218 and the vehicle's current speed and heading are maintained.

However, if the control unit determines that either the position error is greater than the error threshold or the heading error is greater than the heading error threshold, the process 1200 proceeds to 1220. At 1220, the control unit may determine a power source output adjustment and/or a power transfer device output adjustment. For example, the control unit may adjust the speed associated with either the left or right propulsion device by adjusting the power received by the left and/or right propulsion devices via the power source output or the power transfer device output to reduce the slipping of the track over the wheels.

At 1222, the control unit may cause a left drive motor adjustment and/or a right drive motor adjustment. For example, the control unit may make a speed or velocity change to the left or right propulsion devices to reduce the slip rate associated with the corresponding track.

At 1224, the control unit may apply the power source output adjustment, the power transfer device output adjustment, the left drive motor adjustment, and/or the right drive motor adjustment to cause the vehicle to execute a change in velocity or a reduction in the slip rate. It should be understood, that the control unit may not necessarily apply all of the power source output adjustment, the power transfer device output adjustment, the left drive motor adjustment, and/or the right drive motor adjustment to alter the course of the vehicle. Rather, the control unit may apply one or more of the power source output adjustment, the power transfer device output adjustment, the left drive motor adjustment, and/or the right drive motor adjustment.

Returning to 1208, if the control unit determines that either the position error is greater than an error threshold or that the heading error is greater than a heading error threshold, the process 1200 proceeds to 1226. At 1226, the control unit may apply a correction inference module to determine a correctional heading as described below with respect to FIG. 15.

At 1228, the control unit may determine the vehicle heading change rate. For example, the left propulsion device may be propelling the vehicle at a greater velocity than the right propulsion device, causing the vehicle to turn to the right. In this manner, the vehicle may be steering to the right and causing an increase in the heading error as the vehicle heads farther and farther away from the desired heading. In some cases, the control unit may monitor the heading rate change to determine if the current heading is moving back in line with the desired heading of the navigation path or away from the desired heading.

At 1230, the control unit may cause a left drive motor adjustment and/or a right drive motor adjustment as discussed above. For example, the control unit may make a course correction or heading correction to cause the vehicle to move closer to a desired position on the navigation path. In doing so, the control unit may adjust the power output by the left and/or the right drive motor.

At 1232, the control unit may determine a first speed associated with a left propulsion device and a second speed associated with a right propulsion device. For example, since skid-based steering may be utilized by the vehicle, the left propulsion device and the right propulsion device may be able to operate to propel the vehicle at different velocities, so the control unit may determine both the first speed and the second speed. In some cases, the first speed and the second speed may be obtained by left and right propulsion monitoring units electrically or mechanically coupled to the left and right drive motors. In one example, the control unit may calculate the ground linear/actual speed of the left and right propulsion devices by converting the signals sent from propulsion monitoring units into actual ground velocity. By comparing the current overall ground speed and current propulsion actual ground speed, the propulsion device slip rate may be determined by the control unit.

At 1234, the control unit may determine a power source output adjustment and/or a power transfer device output adjustment. For example, the control unit may adjust the speed associated with either the left or right propulsion devices is propelling the vehicle by adjusting the power received by the left and/or right propulsion devices via the power source output or the power transfer device output.

The change in speed may be to cause the vehicle to initiate a course correction to return the vehicle to the navigation path.

At 1236, the control unit may apply the power source output adjustment, the power transfer device output adjustment, the left drive motor adjustment, and/or the right drive motor adjustment to cause the vehicle to execute a course correction, change in trajectory, or reduction in slip rate. It should be understood, that the control unit may not necessarily apply all of the power source output adjustment, the power transfer device output adjustment, the left drive motor adjustment, and/or the right drive motor adjustment to alter the course of the vehicle. Rather, the control unit may apply one or more of the power source output adjustment, the power transfer device output adjustment, the left drive motor adjustment, and/or the right drive motor adjustment. Additionally, the control unit may periodically, constantly, or at various intervals perform the process 1200 to correct the course of the vehicle. For example, the control unit may apply a first set of adjustments at a time T(1), a second set of adjustments at a time T(2), . . . until at a time T(N) the vehicle's heading error is within the heading thresholds and the position error is within the position thresholds.

Figure 13:
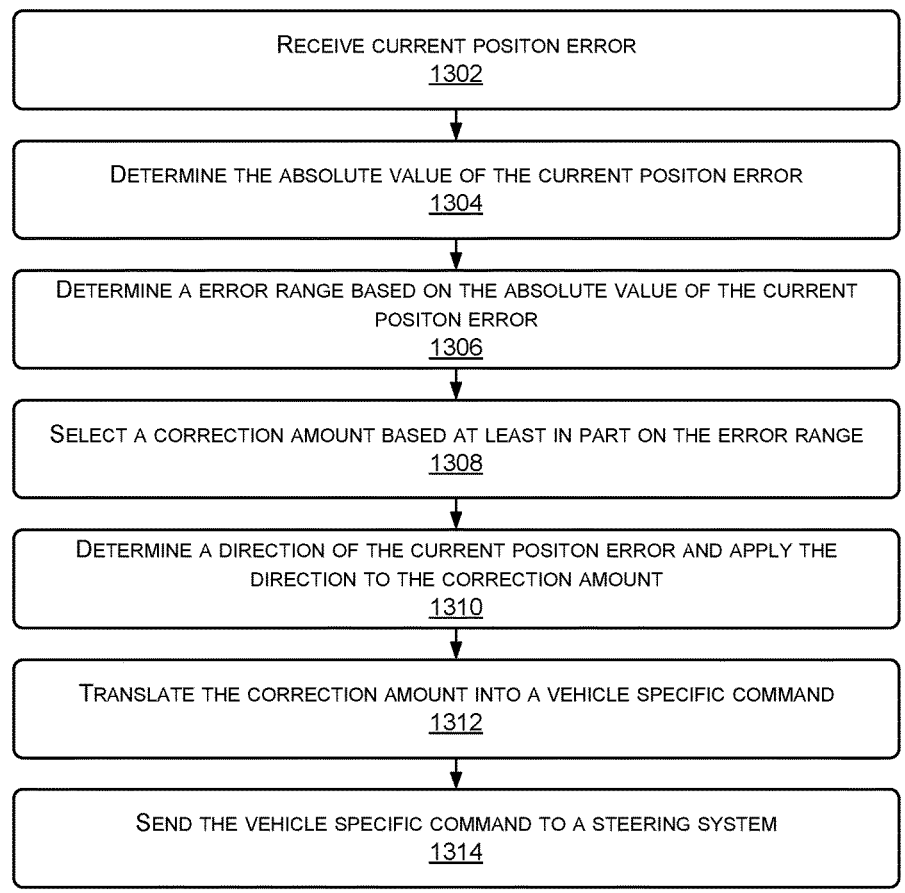
FIG. 13 is an example flow diagram showing an illustrative process for determining correction information associated with a vehicle's speed according to some implementations.

FIG. 13 is an example flow diagram showing an illustrative process for determining correction information associated with a vehicle's speed according to some implementations. In some case, the adjustment applied to the steering system of the vehicle discussed above with respect to FIGS. 7-12 may be translated into a vehicle specific command that may be utilized by the vehicle's steering system to perform the course correction and/or velocity adjustment.

At 1302, a control unit may receive a current position error or data usable to determine a current position error from positioning units. For example, the current position data may be represented in the global longitude, latitude, and altitude (LLA) coordinates, which may be translated to east, north, up (ENU) coordinates for controlling a vehicle. The ENU coordinates may form a local frame using a position reference in an X-Y plane that is tangential to an ellipsoid surface of the Earth as determined by the World Geodetic System 1984 (WGS-84). In one example, the LLA coordinates may first be converted into to an Earth-Centered, Earth-Fixed (ECEF) coordinate system. The ECEF coordinate system is a geographic coordinate system that is based on a Cartesian system represented by positions on an X, Y, and Z access with the center of mass of the Earth being the 0, 0, 0 position. The ECEF coordinates may then be converted into the ENU coordinates using a location of a LLA base station to provide the local coordinates system usable to steer a vehicle.

At 1304, the control unit determines the absolute value of the current position error. For example, the control unit may be represented position error to the right of the desired position as a negative value and position error to the left of the desired position as a positive value. In this manner, the magnitude of the position error may be determined without regards to the direction.

At 1306, the control unit determines an error range based on the absolute value of the current position error. For example, the control unit may assign different correction headings based at least in part on the magnitude of the position error.

At 1308, the control unit may select a correction amount based at least in part on the range of the absolute value of the current position error. For example, the greater the absolute value of the current position error, the larger the change in heading that may be selected by the control unit and applied by the steering system.

At 1310, the control unit determines a direction of the current position error and applies the opposite direction to the correction amount. For example, the control unit may multiple the absolute value by a plus one or by minus one to apply the direction opposite the current position error to the correction amount. For example, if the vehicle was to the left of the desired position, the control unit would apply a right turn by the correction amount to the heading.

At 1312, the control unit may translate the correction amount including direction, into a vehicle specific command. For example, each vehicle manufacturer may have a different set of commands which cause the vehicle to turn to the right or left, adjust a speed or velocity, and/or perform other operations. Likewise, different models between manufactures may also incorporate different commands, for instance, a bulldozer may have different commands than a tractor.

At 1314, the control unit sends the vehicle specific command to the steering system and the steering system may perform the course correction indicated by the command. For instance, the steering system may perform the course correction in the direction and at the amount selected by the control unit.

Figure 14:
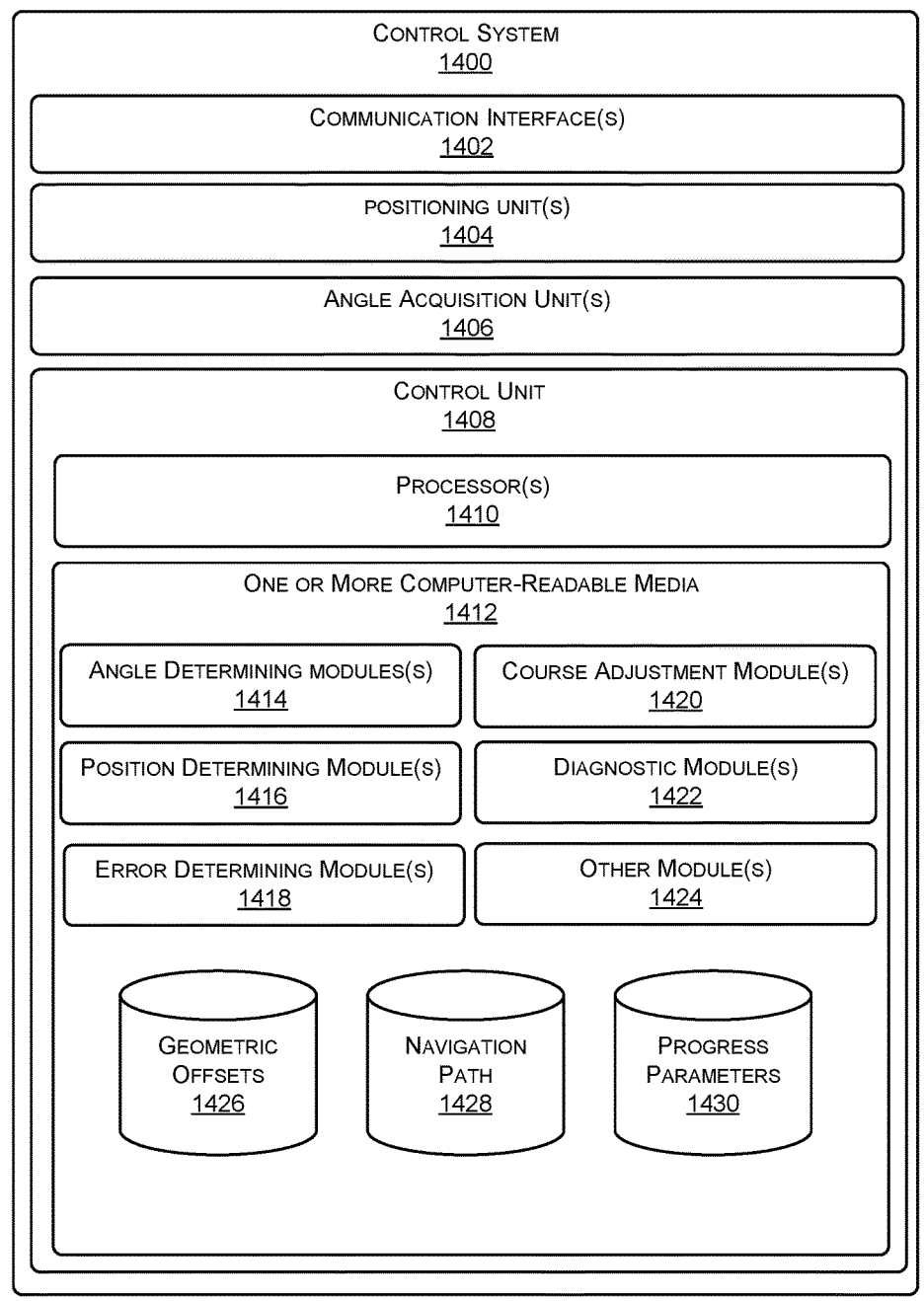
FIG. 14 illustrates example components of one or more servers associated with a control system according to some implementations.

FIG. 14 illustrates example components of one or more servers associated with a control system 1400 according to some implementations. In the illustrated example, the control system 1400 may include one or more communication interfaces 1402, one or more positioning units 1404, and one or more angle acquisition units 1406 for collecting data usable for autonomous control of a vehicle. The control system 1400 may also include a control unit 1408 for translating the data received from the communication interfaces 1402, the positioning units 1404, and the angle acquisition units 1406 into commands that may be utilized by a steering system of the vehicle.

The communication interfaces 1402 may support both wired and wireless connection to various networks, such as cellular networks, radio networks (e.g., radio-frequency identification RFID), WiFi networks, short-range or near-field networks (e.g., Bluetooth®), infrared signals, local area networks, wide area networks, the Internet, and so forth. For example, the communication interfaces 1402 may allow the control system 1400 to receive data, such as a navigation path or progress parameters, from an administrator system or other remote control system.

The positioning units 1404 may include one or more sensor package combinations including Global Navigation Satellite System (GNSS) sensors. In some cases, the positioning units 1404 sensor may be disposed on the top of the vehicle body and include one or more antennas for receiving satellite signals and one or more receivers or other components for decoding the satellite signals and determining a global position of the positioning units 1404. In some cases, the satellite signals received by a GNSS sensor may be in various formats or standards, such as GPS, GLONASS, Galileo, BeiDou as well as other satellite navigation standards.

In some cases, the angle acquisition units 1406 may include one or more accelerometers, one or more gyroscopes, one or more magnetometers, and/or one or more pressure sensors, among others sensors. In one particular example, the angle acquisition units 1406 may include an inertial measurement unit (IMU) sensor or package. For instance, an IMU sensor or package may include three accelerometers placed orthogonally to each other, three rate gyroscopes placed orthogonally to each other, three magnetometers placed orthogonally to each other, and a barometric pressure sensor. In general, the angle acquisition units 1406 are configured to collect data associated with the movement and acceleration of the vehicle during operation.

The control unit 1408 may include processing resources, as represented by processors 1410, and computer-readable storage media 1412. The computer-readable storage media 1412 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 1412 and configured to execute on the processors 1410. For example, an angle determining module 1414, a position determining module 1416, an error determining module 1418, a course adjustment module 1420, a diagnostic module 1422, as well as other modules 1424. In some implementations, the computer-readable media 1412 may store data, such as measured geometric offsets 1426, one or more navigation paths 1428, and progress parameters 1430.

The angle determining module 1414 may be configured to determine the rotational angles of the vehicle from data received from the angle acquisition units 1406 mounted on the vehicle and/or one or more of the positioning units 1404 mounted on the vehicle. For example, the angle determining module 1414 may be configured to convert the data collected by the various angle acquisition units 1406 into the rotation angles of the various components of the vehicle. In another example, by using multiple positioning units 1404 some or all of the rotation angels (pitch, roll, and yaw) may be determined using the position data collected by the positioning units 1404. For example, two positioning units 1404 with lateral offsets between each positioning unit 1404 may be utilized to determine the roll and yaw angles of the vehicle and two positioning units 1404 with longitudinal offsets may determine the pitch and yaw angles. Additionally, the pitch, roll, and yaw angles may be determined using three or more positioning units 1404.

The position determining module 1416 may be configured to receive the LLA coordinates or data usable to determine the LLA coordinates from the positioning units 1404 and to determine a position of a vehicle POI in ENU coordinates. As discussed above, to accurately control the vehicle during operations, the ENU coordinates of the vehicle POI are utilized as a framework, as the ENU represent a position reference in an X-Y plane that is tangential to a surface of the Earth.

Initially, the positioning unit 1404 may decode a satellite signal (or multiple satellite signals) and determine, based on the decoded signal, the LLA coordinates of the positioning unit 1404. In one example, the positioning unit 1404 may first enter an acquisition phase to sample and decode the satellite signal from each visible satellite. The satellite signals include a time stamp and ephemeris data (data related to the location and trajectory of the transmitting satellite). Second, the positioning unit 1404 may perform a series of calculations based on the time stamp and ephemeris data to determine initial LLA coordinates. Each of the positioning units 1404 may then provide the LLA coordinates to the position determining module 1416. The position determining module 1416 may also receive LLA coordinates of a base station (such as a GNSS base station of a geo location system). For example, the LLA coordinates of the base station may be received via the wireless communication interface 1402.

The position determining module 1416 converts the LLA coordinates for each of the positioning units 1404 to an Earth-Centered, Earth-Fixed (ECEF) coordinate system. The ECEF coordinate system is a geographic coordinate system that is based on a Cartesian system represented by positions on an X, Y, and Z axis. In the ECEF coordinate system the 0, 0, 0 position is defined as the center of mass of the Earth.

Next, the position determining module 1416 converts the ECEF coordinates for each positioning unit 1404 to ENU coordinates. As discussed above, the ENU coordinates are based on an X-Y plane that is tangential to a surface of the Earth and is useful for remote control or programmed control/movement of a vehicle on the surface of the Earth with reference to a fixed or known location (such as the positioning system base station). The LLA coordinate of the base station may also be converted into ECEF coordinates and/or ENU coordinates and used by the position determining module 1416 together with an offset between a base station and the vehicle to determine the ECU coordinates of the vehicle. Thus, in some instances, the ENU coordinate system may be utilized as a local reference frame in which an origin point is located at the position of the base station.

The position determining module 1416 may then determine the position of the vehicle's POI using the ENU coordinates of one or more of the positioning units 1404 or a positioning unit reference point and a geometric offset between the positioning unit reference point and the POI. In some cases, the geometric offset may be represented in three dimensions with an X, Y, and Z offset.

The error determining module 1418 may determine a position error and a heading error associated with the current position and the current heading given a desired position and a desired heading. In some cases, the desired position and the desired heading may be determined from the navigation path associated with the current task or operation being performed by the vehicle. In particular, the position error may be the distance between the desired position and the current position and the heading error may be an angle between or associated with the desired heading and the current heading. In another example, the position error may be determined by a line from a center point of a circle formed by the arc of the navigation path through the current position of the vehicle and measuring the distance between the current position and the position at which the line intersects the navigation path.

The course adjustment module 1420 may be configured to calculate heading adjustments, speed or velocity adjustments, power setting adjustment, among others and to convert the adjustments into commands executable by the skid-based steering system of the vehicle. For instance, in one particular example, the course adjustment module 1420 may determine an absolute value of the current position error. In this manner, the magnitude of the position error may be determined without regards to the direction. Next, the course adjustment module 1420 may determine an error range based on the absolute value of the current position error. For example, the course adjustment module 1420 may assign different correction headings or heading adjustments based at least in part on the magnitude of the position error. For example, the greater the absolute value of the current position error the larger the adjustment in heading may be selected by the control unit and applied by the steering system. The course adjustment module 1420 may also determine a direction of the current position error and apply the opposite direction to the correction amount. For example, the course adjustment module 1420 may multiple the absolute value by a plus one or by minus one to apply the direction opposite the current position error to the correction amount. For example, if the vehicle was to the left of the desired position, the control unit would apply a right turn by the correction amount to the heading.

In some cases, the course adjustment module 1420 may translate the correction amount including direction, into a vehicle specific command. For example, each vehicle manufacturer may have a different set of command which cause the vehicle to turn to the right or left, adjust a speed or velocity, and/or perform other operations. Likewise, different models between manufactures may also incorporate different commands, for instance, a bulldozer may have different commands than a tractor.

The course adjustment module 1420 may also be configured to cause the control system or the communication interface 1402 to send the vehicle specific command to the steering system and the steering system may perform the course correction indicated by the command. For instance, the steering system may perform the course correction in the direction and at the amount selected by the course adjustment module 1420.

The diagnostic module 1422 may check the health of the vehicle in response to receiving a test or diagnostic to be performed from the administrator system. For example, the diagnostic module 1422 may be configured to monitor the vehicle during test operations to determine a status and accuracy of the autonomous controls. For example, the diagnostic module 1422 may receive data associated with the operation of the vehicle during the diagnostic test from the positioning units 1404 and/or the angle acquisition units 1406 as well as a left or right proposition monitoring unit (not shown). After completion of the diagnostic test, the diagnostic module 1422 may be configured to cause the communication interface 1402 to my send health data associated with the vehicle back to the administrator system. In some cases, the health data may include operational status of the vehicle, such as green, yellow, red indictors, maximum speed data, minimum turn radius data, etc. In other cases, the health data may include indications that the left or right propulsion devices are malfunctioning or operating to propel the vehicle at a rate lower or higher than expected given a particular control input. In still other cases, the health data may include power transfer status (such as gear position, lubrication level, oil temperature, and pressure), proposition status (such as direction, speed, slip rate, excess wear notification), fuel consumption metrics (such as remaining fuel or leaking notifications), sensor status (such as accuracy, communication liveness, malfunction notifications), among others.

Figure 15:
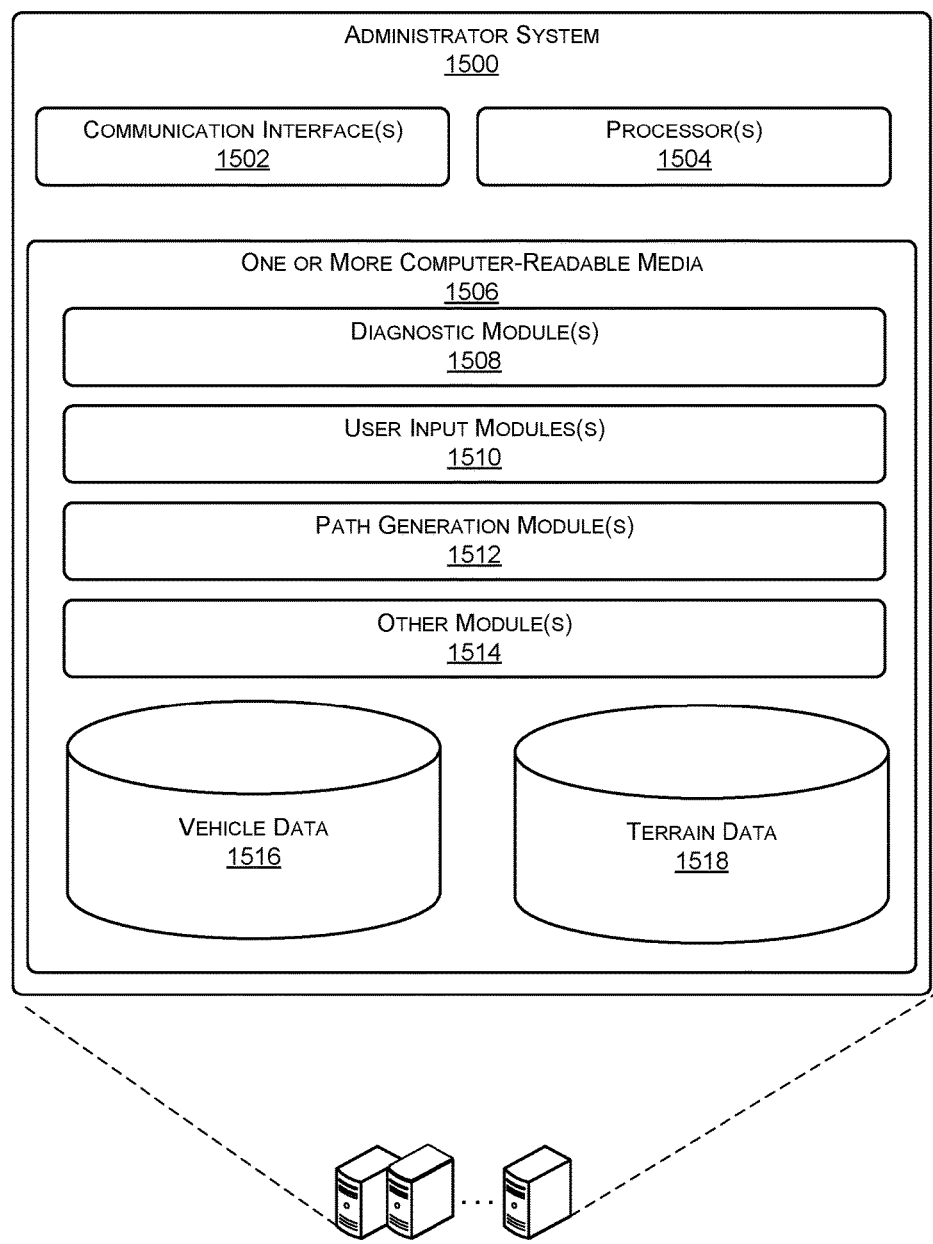
FIG. 15 illustrates example components of one or more servers associated with an administrator system according to some implementations.

FIG. 15 illustrates example components of one or more servers associated with an administrator system 1500 according to some implementations. The administrator system 1500 may be in communication with a control system (such as control system 1400 of FIG. 4) installed on a vehicle. In some cases, the administrator system may allow an operator remote from the vehicle to generate the navigation paths and progress parameters to allow the vehicle to operate autonomously.

In the illustrated example, the administrator system 1500 includes communication interfaces 1502 that may support both wired and wireless connection to various networks, such as cellular networks, radio networks (e.g., radio-frequency identification RFID), WiFi networks, short-range or near-field networks (e.g., Bluetooth®), infrared signals, local area networks, wide area networks, the Internet, and so forth. For example, the communication interfaces 1502 may exchange data, such as a navigation path or progress parameters, with the control system or with a vehicle itself.

The administrator system 1500 may also include processing resources, as represented by processors 1504, and computer-readable storage media 1506. The computer-readable storage media 1506 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 1506 and configured to execute on the processors 1504. For example, a diagnostic module 1508, a user input module 1510, a path generation module 1512, as well as other modules 1514. In some implementations, the computer-readable media 1508 may store data, such as vehicle data 1516 and terrain data 1518. The vehicle data 1516 may include information known about the vehicle, such as power output range, driving speed range, working tool or implement capacity, vehicle dimensions, vehicle weight, ground pressure, range of steering radius, maintenance history, operation or task logs, location, current assignments, last repair visit, stored health, status, or operational data, among others. The terrain data 1518 may include information known about the terrain or location the vehicle is currently assigned to. For example, the terrain data 1518 may include geological surveys and maps, ground type, height and elevation data, flora and fauna associated with the terrain, any improvements or obstacles associated with the terrain, current task being performed on the terrain (e.g., gravel production, mining, logging, etc.), vehicle list assigned to the terrain, boundaries, among others.

The diagnostic module 1508 may cause the administrator system 1500 to establish a communication channel with the vehicle to check the health of the vehicle and the status and accuracy of the autonomous controls in response to an operator initiating the creation of a navigation path. For instance, the diagnostic module 1508 may send diagnostic test instructions to the control system on the vehicle to engage the navigation controls and collect data associated with the operations of the vehicle. After completion of the diagnostic test, the control unit may send health data associated with the vehicle back to the administrator system 1500. In some cases, the health data may include operational status of the vehicle, such as green, yellow, red indictors, maximum speed data, minimum turn radius data, etc. In other cases, the health data may include indications that the left or right propulsion devices are malfunctioning or operating to propel the vehicle at a rate lower or higher than expected given a particular control input.

The user input module 1510 may allow the operator to provide inputs into the creation of the navigation path or the progress parameters. For example, the user input module 1510 may present the operator with selectable options to define or draw the navigation path, to input the navigation parameters (e.g., width of the navigation path), select a type of navigation, type of activity or operation to be performed (e.g., in the case of a bulldozer, grading, leveling, sloping, etc.), operation preferences (e.g., time limits for the task, fuel usage limits, wear and tear limits, etc.). In some cases, the user input module 1510 may allow the operator to select or input various information known about the vehicle or about the terrain and useful for generating the navigation path and the progress parameters.

The path generation module 1512 is configured to generate the navigation path and the progress parameters based at least in part on the user inputs and the health data. For example, the path generation module 1512 may modify a path defined or outlined by the operator to increase a turning radius to, thereby, reduce the potential for decoupling a track from the wheel. In another example, the path generation module 1512 may alter a route up a steep incline to ensure the vehicle does not become stuck or off course when traversing the incline.

In some cases, the path generation module 1512 may access vehicle data 1516 and/or terrain data 1518 to assist with generating the navigation path to comply with the operational preferences input by the operator. For example, the navigation path outlined by the operator may have defined a maneuver or operation that in the past has caused the vehicle to stall. In this example, the path generation module 1512 may redefine the maneuver or operation to accomplish the desired task without resulting in the vehicle stalling. In another example, the operator may have defined a path over ground that may not be firm enough to support the weight of the vehicle. The path generation module 1512 may access the terrain data 1518 to determine the firmness of the ground and the vehicle data 1516 to determine the weight of the vehicle. The path generation module 1512 may redefine the route of the vehicle to avoid the hazardous ground or select a different lighter vehicle to perform the task. In some cases, the path generation module 1512 may utilize fuzzy logic, machine learning, and/or various user generated tables to assist in finalizing the navigation path and the progress parameters to achieve the desired operation within the desired operation preferences selected by the operator.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A vehicle comprising:
a left propulsion device to propel a left side of the vehicle at a first velocity in a first direction;
a right propulsion device to propel a right side of the vehicle at a second velocity in a second direction;
a skid-based steering system, the skid-based steering system including a left drive motor to drive the left propulsion device and a right drive motor to drive the right propulsion device;
a control system electrically coupled to the skid-based steering system, the control system to send a command to the skid-based steering system, the command to cause the skid-based steering system to propel the vehicle in a desired manner, the control system including:
a wireless communication interface to receive a navigation path from a remote device;
an angle acquisition unit to collect data associated with a movement of the vehicle and rotational angular rates of the vehicle;
a positioning unit to collect data associated with a global position of the vehicle; and
a control unit to determine attributes of the command based at least in part on the navigation path, the data associated with the movement of the vehicle, the data associated with the rotational angular rates of the vehicle, the data associated with the global position of the vehicle.

2. The vehicle as recited in claim 1, further comprising:
a left propulsion monitoring unit to measure the first velocity and a first direction of the left propulsion device;
a right propulsion monitoring unit to measure the second velocity and a second direction of the right propulsion device; and
wherein the control unit determines the command based at least in part on the first velocity, the first direction, the second velocity, and the second direction.

3. The vehicle as recited in claim 1, further comprising:
a left propulsion monitoring unit to measure the first velocity and a first direction of the left propulsion device;
a right propulsion monitoring unit to measure the second velocity and a second direction of the right propulsion device; and
wherein the control unit determines a first slip rate associated with the left propulsion device based at least in part on the first velocity and the first direction and a second slip rate associated with the right propulsion device based at least in part on the second velocity and the second direction.

4. The vehicle as recited in claim 1, further comprising:
a power source to generate power; and
a power transfer device to regulate a power range associated with the left drive motor and the right drive motor.

5. The vehicle as recited in claim 1, further comprising:
a power source configured to receive a first signal to control the power output of the power source; and
a power transfer device configured to receive a second signal to specify a power range from the control unit.

6. The vehicle as recited in claim 1, wherein the left propulsion device includes at least one track and wheel.

7. The vehicle as recited in claim 1, wherein the left propulsion device includes at least one drive propeller for propelling the vehicle.

8. The system as recited in claim 1, wherein the control system is further configured to receive a diagnostic signal from the remote device and, in response, to send operational status and health data to the remote device via the wireless communication interface.

9. A system for providing autonomous control of a vehicle comprising:
a wireless communication interface to receive a navigation path from a remote device;
an angle acquisition unit to collect data associated with a rotational angles of the vehicle, rotational acceleration, and rotational angular rates of the vehicle;

a positioning unit to collect data associated with a global position of the vehicle; and a control unit to determine a command associated with steering the vehicle, controlling vehicle moving direction, adjusting vehicle moving velocity and controlling vehicle power output based at least in part on the navigation path, the data associated with the rotational angles of the vehicle, rotational acceleration of the vehicle, rotational angular rates of the vehicle, the data associated with the global position of the vehicle.

10. The system as recited in claim 9, further comprising:
a left propulsion monitoring unit to measure a first velocity and a first direction of a left propulsion device of the vehicle;
a right propulsion monitoring unit to measure a second velocity and a second direction of a right propulsion device of the vehicle; and
wherein the control unit determines the command based at least in part on the first velocity, the first direction, the second velocity, and the second direction.

11. The system as recited in claim 9, further comprising:
a left propulsion monitoring unit to measure a first velocity and a first direction of a left propulsion device of the vehicle;
a right propulsion monitoring unit to measure a second velocity and a second direction of a right propulsion device of the vehicle; and
wherein the control unit determines a first slip rate associated with the left propulsion device based at least in part on the first velocity and the first direction and a second slip rate associated with the right propulsion device based at least in part on the second velocity and the second direction.

12. The system as recited in claim 9, wherein the control unit is in communication with a power transfer device of the vehicle to receive data associated with a power range.

13. The system as recited in claim 9, wherein a control system is further configured to cause the vehicle to perform a series of maneuvers in response receiving a diagnostics signal from the remote device.

14. The system as recited in claim 9, wherein a control system is further configured to cause the wireless communication interface to send the data associated with the rotational angles of the vehicle, rotational acceleration of the vehicle, rotational angular rates of the vehicle, the data associated with the global position of the vehicle, the data associated with the global position of the vehicle to the remote device.

15. The system as recited in claim 9, wherein a control system is further configured to:
determine a position error based at least in part on the data associated with the global position of the vehicle and the navigation path;
determine a heading error based at least in part on the data associated with the rotational angles of the vehicle and the navigation path; and
determine a correctional heading based at least in part on the position error, the heading error and the heading angular rate of the vehicle;
determine a correctional moving direction based at least in part on the position error and the heading error;
determine a correctional moving velocity based at least in part on the position error, the heading error, a heading angular rate, and a vehicle slip rate; and
determine a correctional power output based at least in part on the position error, the heading error, the heading angular rate, the vehicle slip rate.

16. A method comprising:
under control of one or more processors configured with executable instructions,
receiving a navigation path from a remote system via a wireless communication interface;
receiving data associated with a global position of a vehicle from a positioning unit;
receiving data associated with a rotational angles of the vehicle from an angle acquisition unit;
determining a position error based at least in part on the data associated with the global position of the vehicle and the navigation path;
determining a heading error based at least in part on the data associated with the rotational angles of the vehicle and the navigation path; and
determining a command to cause the vehicle to adjust a course heading based at least in part on the position error and the heading error.

17. The method as recited in claim 16, further comprising determining that the position error is greater than a position threshold and the heading error is greater than a heading threshold prior to determining the command.

18. The method as recited in claim 16, further comprising converting the data associated with the global position to east, north, up coordinates prior to determining the position error.

19. The system as recited in claim 9, wherein the control unit is configured to:
determining a position error based at least in part on the data associated with the global position of the vehicle and the navigation path;
determining a heading error based at least in part on the data associated with the rotational angles of the vehicle and the navigation path;
determining a slip rate based at least in part on the data associated with the global position of the vehicle and the left and right drive unit output velocity;
determine a desired position along the navigation path, the desired position being a closest position between the vehicle and the navigation path;
determining a second command to cause the vehicle to adjust a course heading based at least in part on the position error, the heading error, and a desired position indicated by the navigation path;
determining a third command to cause the vehicle to adjust the power output based at least in part on the position error, the heading error, and slip rate; and
determining a fourth command to cause the vehicle to adjust the movement velocity based at least in part on the position error, the heading error, and the slip rate.

20. The method as recited in claim 16, further comprising
receiving data associated with a rotational angular rate of the vehicle from an angular rate acquisition unit;
receiving data associated with a first movement velocity of the vehicle from a left velocity measurement unit;
receiving data associated with a second movement velocity of the vehicle from a right velocity measurement units;
determine a wheel or track slip rate based at least in part on the data associated with the global position of the vehicle and vehicle wheels or tracks velocity;
determining a command to cause the vehicle to adjust a course heading, movement direction, first movement velocity and second movement velocity based at least in part on the position error, the heading error, the rotational angular rate, and vehicle wheel or track slip.

* * * * *